(12) United States Patent
Yang et al.

(10) Patent No.: US 11,880,208 B2
(45) Date of Patent: Jan. 23, 2024

(54) METHOD FOR DRIVABLE AREA DETECTION AND AUTONOMOUS OBSTACLE AVOIDANCE OF UNMANNED HAULAGE EQUIPMENT IN DEEP CONFINED SPACES

(71) Applicant: CHINA UNIVERSITY OF MINING AND TECHNOLOGY, Jiangsu (CN)

(72) Inventors: Chunyu Yang, Jiangsu (CN); Zhencai Zhu, Jiangsu (CN); Yidong Zhang, Jiangsu (CN); Xin Zhang, Jiangsu (CN); Zhen Gu, Jiangsu (CN); Qingguo Wang, Jiangsu (CN)

(73) Assignee: CHINA UNIVERSITY OF MINING AND TECHNOLOGY, Jiangsu (CN)

( * ) Notice: Subject to any disclaimer, the term of this patent is extended or adjusted under 35 U.S.C. 154(b) by 0 days.

(21) Appl. No.: 18/022,645

(22) PCT Filed: Feb. 23, 2022

(86) PCT No.: PCT/CN2022/077433
§ 371 (c)(1),
(2) Date: Feb. 22, 2023

(87) PCT Pub. No.: WO2023/123642
PCT Pub. Date: Jul. 6, 2023

(65) Prior Publication Data
US 2023/0305572 A1 Sep. 28, 2023

(51) Int. Cl.
*G05D 1/02* (2020.01)
*G06V 20/56* (2022.01)
(Continued)

(52) U.S. Cl.
CPC ......... *G05D 1/0251* (2013.01); *G05D 1/0214* (2013.01); *G06T 5/10* (2013.01);
(Continued)

(58) Field of Classification Search
CPC ............... G05D 1/0251; G05D 1/0214; G05D 2201/0202; G06T 5/10; G06T 5/20;
(Continued)

(56) References Cited

U.S. PATENT DOCUMENTS

2015/0242700 A1* 8/2015 Zhang ..................... G06T 7/269
382/154
2017/0310946 A1* 10/2017 Ge ........................ H04N 13/275
(Continued)

FOREIGN PATENT DOCUMENTS

| CN | 107817798 | 3/2018 |
| CN | 110058587 | 7/2019 |

(Continued)

OTHER PUBLICATIONS

Yang, Jian-jian et al. Dynamic path planning of roadheader based on VSPSO and A-G net, Control and Decision, Mar. 2019, vol. 34, No. 3, 7 pages, English Abstract.
(Continued)

*Primary Examiner* — Nga X Nguyen
(74) *Attorney, Agent, or Firm* — Casimir Jones, S.C.; Brian F. Bradley

(57) ABSTRACT

A method for drivable area detection and autonomous obstacle avoidance of unmanned haulage equipment in deep confined spaces is disclosed, which includes the following steps: acquiring 3D point cloud data of a roadway; computing a 2D image drivable area of the coal mine roadway; acquiring a 3D point cloud drivable area of the coal mine roadway; establishing a 2D grid map and a risk map, and performing autonomous obstacle avoidance path planning by using a particle swarm path planning method designed for deep confined roadways; and acquiring an optimal end point to be selected of a driving path by using a greedy strategy, and enabling an unmanned auxiliary haulage (Continued)

vehicle to drive according to the optimal end point and an optimal path. Images of a coal mine roadway are acquired actively by use of a single-camera sensor device.

6 Claims, 5 Drawing Sheets

(51) Int. Cl.
      *G06T 7/593*       (2017.01)
      *G06V 20/70*       (2022.01)
      *G06V 20/40*       (2022.01)
      *G06T 7/155*       (2017.01)
      *G06T 7/00*       (2017.01)
      *G06T 5/20*       (2006.01)
      *G06T 5/10*       (2006.01)
      *G06V 20/58*       (2022.01)

(52) U.S. Cl.
      CPC .............. *G06T 5/20* (2013.01); *G06T 7/0012* (2013.01); *G06T 7/155* (2017.01); *G06T 7/593* (2017.01); *G06V 20/41* (2022.01); *G06V 20/58* (2022.01); *G06V 20/588* (2022.01); *G06V 20/70* (2022.01); *G05D 2201/0202* (2013.01); *G06T 2207/10012* (2013.01); *G06T 2207/10028* (2013.01); *G06T 2207/20021* (2013.01); *G06T 2207/20028* (2013.01); *G06T 2207/20036* (2013.01); *G06T 2207/20048* (2013.01); *G06T 2207/20081* (2013.01); *G06T 2207/30256* (2013.01); *G06T 2207/30261* (2013.01)

(58) Field of Classification Search
      CPC ....... G06T 7/0012; G06T 7/155; G06T 7/593; G06T 2207/10012; G06T 2207/10028; G06T 2207/20021; G06T 2207/20028; G06T 2207/20036; G06T 2207/20048; G06T 2207/20081; G06T 2207/30256; G06T 2207/30261; G06V 20/41; G06V 20/58; G06V 20/588; G06V 20/70; G06N 3/006

See application file for complete search history.

(56) References Cited

U.S. PATENT DOCUMENTS

2018/0348346 A1* 12/2018 Vallespi-Gonzalez ......................
                                                                              G01S 7/4861
2021/0063578 A1      3/2021  Wekel et al.

FOREIGN PATENT DOCUMENTS

| CN | 110058587 A | * | 7/2019 | ........... G05D 1/0212 |
|---|---|---|---|---|
| CN | 111062900 B | * | 2/2021 | |
| CN | 112785643 | | 5/2021 | |
| CN | 113047909 A | * | 6/2021 | |
| CN | 113126629 A | * | 7/2021 | ........... G05D 1/0221 |
| CN | 113255520 | | 8/2021 | |
| CN | 113298727 A | * | 8/2021 | |

OTHER PUBLICATIONS

Written Opinion of the International Searching Authority, International Patent Application No. PCT/CN2022/077433, dated Sep. 23, 2022, 4 pages.

* cited by examiner

METHOD FOR DRIVABLE AREA DETECTION AND AUTONOMOUS OBSTACLE AVOIDANCE OF UNMANNED HAULAGE EQUIPMENT IN DEEP CONFINED SPACES

TECHNICAL FIELD

The present disclosure relates to the technical field of machine vision and automatic driving, and more particularly relates to a method for drivable area detection and autonomous obstacle avoidance of unmanned haulage equipment in deep confined spaces.

BACKGROUND

An auxiliary haulage vehicle for coal mines is an important constituent device of a mine production system, and undertakes tasks of haulage of personnel, equipment, materials and the like, and it is challenging for the auxiliary haulage vehicle for coal mines to operate in a deep underground confined space.

A coal mine roadway environment is characterized by high perception difficulty, severe environment, more interferences, complex personnel, low illumination, single scene and more emergencies, thus, the technical innovation in how to obtain drivable areas and undrivable areas of a coal mine roadway through sensor equipment and then perform local path planning for autonomous obstacle avoidance by an auxiliary haulage vehicle for coal mines to obtain an optimized path occupies an important role in the intelligent decision-making technology of explosion-proof haulage vehicles in a deep underground confined space.

A LIDAR directly obtains 3D point cloud data of a coal mine roadway, and due to the unorderness of 3D point clouds, in a traditional 3D point cloud clustering algorithm and a 3D point cloud segmentation algorithm based on a neural network, a large amount of processor resources is required in arithmetic processing. In a 3D point cloud segmentation algorithm implemented by combining a LIDAR with a camera, the semantic segmentation information of a 2D image and the information of a 3D point cloud need to be acquired, and the camera and the LIDAR need to be subjected to pixel and point calibration, thus, the computation process is tedious.

Patent publication No. CN110188817B discloses a real-time high-performance street-view image semantic segmentation method based on deep learning, in which a street-view image is taken as a training data set, a lightweight network is taken as a feature extraction network, and a hole pyramid structure is combined to serve as a real-time high-performance street-view semantic segmentation network model. Patent publication No. CN112927244A discloses a 3D scene segmentation method and device under weak supervision, in which block-level labels are obtained by block-level labeling, pseudo labels of unlabeled points are obtained based on over-segmentation images, and the obtained pseudo labels can be used as training data of an existing strong supervision point cloud segmentation network. Patent publication No. CN112818999A discloses a complex scene 3D point cloud semantic segmentation method based on a convolutional neural network, in which by down-sampling an original point cloud and merging a self-attention mechanism, the network model has a better practical application effect.

The above existing patents have described methods for performing the semantic segmentation of 2D images and the semantic segmentation of 3D point clouds by using a convolutional neural network. However, the above methods have the following deficiencies: 1. a method for semantic segmentation of 2D point clouds can only obtain plane information; 2. a method for semantic segmentation of 3D point clouds requires processing based on existing 3D point cloud data, and the point cloud data which it depends on can be obtained by sensors such as a LIDAR and an RGB-D camera and the like, but the LIDAR is high in price and poor in adaptability, and the measurable distance of the RGB-D camera is fairly limited; 3. a real-time semantic segmentation method directly based on a 3D point cloud has great dependence on hardware equipment, thus, the real-time performance is constrained; and 4. in the above methods, the requirements on easiness, accuracy and rapidness in practical engineering applications are not taken into consideration, thus, the methods can not satisfy the demands of an auxiliary haulage vehicle for coal mines in deep underground spaces on the real-time segmentation of 3D point cloud drivable areas of coal mine roadways.

Autonomous obstacle avoidance is a basic key technology for an auxiliary haulage vehicle to complete an autonomous operation. Currently commonly used autonomous obstacle avoidance methods may be divided into two categories: a heuristic planning algorithm and an incremental planning algorithm. The heuristic planning method has a certain directivity (such as the influence of the end point and important nodes), while a non-heuristic planning method is more biased to random traversal search during optimization. The incremental planning method uses previous planning information to affect current path planning, and the principle thereof endows the algorithm with a "memory" capability to obtain a better output path. However, in a deep coal mine roadway, since the space is long, narrow and closed, many turns and slope-variable sections are present, the personnel behavior is complex, a large number of blind areas exist, and many emergency situations are present, the driving environment is complex, which affects the autonomous obstacle avoidance of vehicles, and as a result, a single heuristic planning algorithm and a single incremental planning algorithm are difficult to well complete autonomous obstacle avoidance in a deep confined space. Therefore, it is necessary to combine environmental perception and safety assessment information to study the autonomous obstacle avoidance technologies of auxiliary haulage vehicles. Among them, a better method is the evolutionary computational method, which has both heuristic and incremental characteristics, and thus can be well applied to underground autonomous obstacle avoidance.

Patent No. CN201811385877.1 discloses an intelligent path planning method for double-welding robots based on an ant colony algorithm, in which welding seams are numbered, and sorted by using the ant colony algorithm to obtain a most effective welding seam sorting combination. Patent publication No. CN109581987B discloses an automated guided vehicle (AGV) scheduling and path planning method and system based on a particle swarm algorithm, and in the method, vehicle path planning is achieved by numbering and sorting scheduled cargoes using an original particle swarm optimization algorithm. Patent publication No. CN111708369B discloses a path planning method for a substation inspection robot, in which a topological map of a substation is established, and nodes of the topological map are sorted and optimized by using an ant colony algorithm to obtain a globally optimal inspection closed-loop route.

The above existing patents have described path planning methods using evolutionary computational methods (including an ant colony algorithm, a particle swarm optimization algorithm, etc.). However, the above methods have the following deficiencies: 1. the maps used are basically topological maps, but such maps cannot effectively depict obstacle information of workspaces, thus the methods are more applicable to global path planning instead of autonomous obstacle avoidance; 2. in the evolutionary computational path planning methods using grid maps, the effective utilization of environment perception information is not taken into consideration, and a state evaluation method for environments is absent, thus, the methods are not applicable to autonomous obstacle avoidance solutions of deep confined roadways; 3. there are two main categories of evolutionary computational path planning methods: discrete methods mainly including an ant colony algorithm, a genetic algorithm and the like; and continuous methods mainly including a particle swarm optimization algorithm, an acoustic algorithm and the like. When a discrete path planning method is used, only the next position of a vehicle is generated in each iteration until the vehicle arrives at an end point, thus the computation speed is low; and when a continuous method is used, although a set of feasible paths may be generated in each iteration, a coordinate map is generally used, thus, the method is not applicable to a mine environment, and if a grid map and the like are used, a breakpoint will be generated on a path subjected to integer processing because a computation result is not an integer.

SUMMARY

In view of the deficiencies in the prior art, the present disclosure provides a method for drivable area detection and autonomous obstacle avoidance of unmanned haulage equipment in deep confined spaces, in which, for the features of a deep underground confined roadway in a coal mine, such as low illumination, convergence and destruction of some roadways, and complex scenes including water puddles and roof leakage and the like, the deep confined roadway can be subjected to drivable area segmentation by using a drivable area detection technology of deep confined spaces based on a binocular camera, a roadway environment information support is provided, a commonly used and technically stable grid map is established, an operation map of an auxiliary haulage vehicle in the deep confined roadway is established, a risk map is established in combination with drivable area detection information, and parallel computing is performed by using a path planning method based on an improved particle swarm optimization algorithm to realize safe and autonomous obstacle avoidance of the unmanned auxiliary haulage vehicle. The present disclosure addresses the requirements of an auxiliary haulage vehicle for coal mines in acquiring information on 3D point cloud drivable areas and obstacles in safety scene assessment in a coal mine roadway, and achieves the autonomous obstacle avoidance driving of the auxiliary haulage vehicle in a deep confined roadway.

To achieve the above objective, the present disclosure adopts the following technical solutions:

Embodiments of the present disclosure provide a method for drivable area detection and autonomous obstacle avoidance of unmanned haulage equipment in deep confined spaces, which includes the following steps:

S1: performing environmental perception by use of binocular vision, and detecting a drivable area of an unmanned auxiliary haulage vehicle in a deep coal mine roadway; specifically including:

S11: collecting, by a binocular camera, a video image of the auxiliary haulage vehicle driving in the coal mine roadway, and preprocessing a coal mine roadway image;

S12: for a preprocessed coal mine roadway image obtained in step S11, designing a stereo matching algorithm specific to a stereo matching task of the coal mine roadway to implement the generation of a depth map of the coal mine roadway and the computation of 3D point cloud data; specifically including:

S121: constructing an atrous convolution window with a specification of 5*5, and assigning different weights to different positions of the window according to a 2D Gaussian distribution function, where the weights in a sequence from left to right and top to bottom are respectively 3, 0, 21, 0, 3, 0, 0, 0, 0, 0, 21, 0, 1, 0, 21, 0, 0, 0, 0, 0, 3, 0, 21, 0, 3;

S122: covering a left view of the coal mine roadway image with the convolution window constructed in step S121, and selecting pixel points in all coverage areas;

S123: covering a right view of the coal mine roadway image with the convolution window constructed in step S121, and selecting pixel points in all coverage areas;

S124: finding an absolute value of a gray value difference of all corresponding pixel points in the convolution window coverage areas of the left and right coal mine roadway views in step S122 and step S123, and according to the weights of the different positions of the window in step S121, performing weighted summation on the weights as a matching cost by using a formula as follows:

$$C_{matching\ cost}(p, d) = \sum_{q \in N_p} \left( \left| I^L(q) - I^R(qd) \right| \cdot w_q \right)$$

where, p is a pixel of the coal mine roadway image, d is a disparity of the coal mine roadway image, $I^L$ (q) and $I^R$ (qd) are window elements taking q and qd as image centers on the left and right coal mine roadway images respectively, w q is the weight of the different positions of the convolution window, and N p is the 5*5 Gaussian atrous convolution window;

S125: performing matching cost aggregation according to a matching cost computation method in step S124, where a matching cost aggregation step size d step is adaptively changed according to a pixel luminance of the coal mine roadway image by using a formula as follows:

$$d_{step} = \frac{D_{max} - 1}{G_{max} - G_{min}} \cdot g + \frac{G_{max} - G_{min}D_{max}}{G_{max} - G_{min}}$$

where, $D_{max}$ is a maximum disparity of a binocular image of the coal mine roadway, $G_{max}$ and $G_{min}$ are a maximum gray value and a minimum gray value of a gray image of the coal mine roadway respectively, and g is a gray value of the gray image of the coal mine roadway;

S126: based on matching costs in an adaptive matching cost aggregation step size d step range obtained in step S125, finding a window with a minimum matching cost value as a disparity by using a winner-take-all (WTA) algorithm, and performing cyclic computation to obtain disparity maps of the coal mine roadway;

S127: based on the disparity maps of the coal mine roadway obtained in step S126, performing disparity image optimization in accordance with a left-right consistency constraint criterion by using a formula as follows:

$$D = \begin{cases} D_l & \text{if } |D_l - D_r| \leq 1 \\ D_{invalid} & \text{otherwise} \end{cases}$$

where, Di is a left disparity map, D r is a right disparity map, and $D_{invalid}$ is an occlusion point where no disparity exists; and S128: based on a disparity optimization image of the coal mine roadway obtained in step S127, performing disparity-map to 3D-data computation according to a binocular stereo vision principle, and obtaining 3D point cloud information ($X_w$, $Y_w$, $Z_w$) of the coal mine roadway in the advancing direction of the unmanned haulage vehicle by using a formula as follows:

$$\begin{cases} X_w(x, y) = \dfrac{b \cdot f \cdot (x - u)}{\alpha \cdot d(x, y)} \\ Y_w(x, y) = \dfrac{b \cdot f \cdot (y - v)}{\beta \cdot d(x, y)} \\ Z_w(x, y) = \dfrac{b \cdot f}{d(x, y)} \end{cases}$$

where, b is a distance between left and right optical centers of a binocular camera, $f$ is a focal distance of the camera, d is a disparity of the coal mine roadway image, (x, y) indicates pixel coordinates of the coal mine roadway image, (u, v) indicates coordinates of an origin of an image coordinate system in a pixel coordinate system, and α and β are the focal distances of a pixel in the x and y directions of an image plane respectively;

S13: for the preprocessed coal mine roadway image obtained in step S11, designing a deep learning model for a semantic segmentation task of the coal mine roadway to implement the drivable area semantic segmentation of a 2D image of the coal mine roadway; specifically including:

S131: making a semantic segmentation data set of the coal mine roadway in which only a drivable area of the roadway is marked, which specifically includes:

S1311: performing marking by using labelme image marking software, and starting the labelme software;

S1312: opening a coal mine roadway image folder, and selecting an image;

S1313: only selecting the drivable area of the coal mine roadway with a frame, and naming the drivable area drivable area; and S1314: repeating steps S1312 and S1313, so as to finally complete the making of the drivable area semantic segmentation data set of the 2D image of the coal mine roadway;

S132: pre-training a semantic segmentation model deep-LabV3+ model based on a PASCAL VOC data set;

S133: based on a pre-trained deeplabv3+ model obtained in step S132 and the drivable area semantic segmentation data set of the coal mine roadway obtained in step S131, performing pre-trained model fine-tuning;

S134: performing real-time drivable area semantic segmentation of the 2D image of the coal mine roadway according to the deep learning model fine-tuned with the data set of the coal mine roadway obtained in step S133 to obtain a 2D image drivable area;

S14: according to the 3D point cloud data of the coal mine roadway obtained in step S12 and a 2D drivable area segmentation image of the coal mine roadway obtained in step S13, designing a 2D-image to 3D-point-cloud mapping method to implement the drivable area semantic segmentation of a 3D point cloud of the coal mine roadway; specifically including:

S141: according to the 2D image drivable area obtained in step S134, performing drivable area image processing based on morphological opening operation; and S142: according to a left coal mine roadway view of the unmanned auxiliary haulage vehicle, performing segmentation for mapping the 2D image drivable area obtained in step S134 to the 3D point cloud so as to obtain a 3D point cloud drivable area of the coal mine roadway by using a formula as follows:

$$P(x, y, z) = \begin{cases} P(x, y, z) & (x, y) \in I(x, y) \\ 0 & (x, y) \notin I(x, y) \end{cases}$$

where, P (x, y, z) is the 3D point cloud data of the coal mine roadway obtained in step S128, I (x, y) is a drivable area image of the coal mine roadway obtained after morphological processing is performed in step S141, and (x, y) indicates pixel coordinates of the left coal mine roadway view collected by the binocular camera;

S2: determining a drivable area of a deep confined roadway according to drivable area detection information in step S1, and performing safe driving of the unmanned auxiliary haulage vehicle in the deep confined roadway by using an autonomous obstacle avoidance algorithm based on an improved particle swarm optimization algorithm; specifically including:

S21: establishing a 2D workspace grid map of the unmanned auxiliary haulage vehicle based on the drivable area detection information in step S1, and intercepting a roadway grid map with an appropriate length, where the roadway grid map includes deformation and roof leakage of blanket nets and support materials at the top of the roadway, deformation, destruction, leakage and cracking on both sides of the deep coal mine roadway, and water puddles and other obstacles on the ground surface of the roadway;

S22: establishing a risk grid map based on the projection of the drivable area in step S1, where the risk grid map contains a safety area, a partial safety area and a complete risk area; the safety area is a part of the drivable area in step S1, in which the unmanned auxiliary haulage vehicle is allowed to drive directly; the complete risk area is an undrivable area, in which the unmanned auxiliary haulage vehicle is completely not allowed to drive; the partial safety area is a drivable area obtained by segmenting in step S1 between the safety area and the undrivable area, in which there is a risk when the unmanned auxiliary haulage vehicle drives; and in autonomous obstacle avoidance planning, a driving route of the vehicle should be planned in the safety area as much as possible, and cannot be planned in a safety risk area, and under a certain condition, the driving route of the vehicle is allowed to include the partial safety area, but should be far away from the complete risk area as much as possible; and a rule of establishment among the three kinds of areas is as follows:

S221: area risk levels are established according to the drivable area of the vehicle obtained by segmenting in step S1: the undrivable area itself is at a highest level eight neighbor grids of a current grid are set to be at a risk level 4 by taking a grid where the undrivable area is located as a reference point; repeating is performed in a similar fashion until a risk level 1 reaches; the risk levels of other grids that are not at risk are still 0, that is, they are fully passable;

S222: if there is a conflict in the risk level of a grid, the grid with the conflict is assessed with the highest risk level; and S223: the undrivable area itself is an absolute complete risk area in which vehicles are not allowed to drive, and the safety area and the partial safety area (risk levels 1-4) are both drivable areas, where a grid with the risk level of 0 is a safety area;

S23: intercepting a map with an appropriate length, selecting, in the map, a grid allowed to serve as a local end point by taking the unmanned auxiliary haulage vehicle as a start point of the current map, and recording the grid into a table of end points to be selected in accordance with a rule as follows:

S231: an end point to be selected is in the last column of a local grid map;

S232: the grid is not an obstacle grid;

S233: the neighbor grids of the end point to be selected at least include one passable grid; and S234: the grid is not surrounded by obstacles;

S24: performing autonomous obstacle avoidance path planning by using an improved particle swarm path planning method designed for the deep confined roadway;

S25: obtaining an optimal end point to be selected of a driving path by using a greedy strategy, and enabling the unmanned auxiliary haulage vehicle to drive according to the optimal end point and an optimal path; and S26: repeating steps S21 to S25 to complete the autonomous obstacle avoidance of the unmanned auxiliary haulage vehicle in the deep confined roadway until the unmanned auxiliary haulage vehicle arrives at a task destination.

Further, in step S11, the process of collecting, by a binocular camera, a video image of the auxiliary haulage vehicle driving in the coal mine roadway, and preprocessing a coal mine roadway image includes the following steps:

S111: performing coal mine roadway image correction processing by using a Hartley image correction algorithm;

S112: performing coal mine roadway image enhancement processing on a corrected image obtained in step S111 by using an image enhancement algorithm based on logarithmic Log transformation; and S113: performing image filtering processing on an enhanced image obtained in step S112 by using an image filtering algorithm based on bilateral filtering.

Further, in step S111, the process of performing coal mine roadway image correction processing by using a Hartley image correction algorithm includes the following steps:

S1111: obtaining an epipolar constraint relationship of the left and right coal mine roadway images obtained according to a camera calibration algorithm, and finding epipolar points p and p' in the left and right coal mine roadway images;

S1112: computing a transformation matrix H' mapping p' to an infinity point $(1, 0, 0)^T$;

S1113: computing a photographic transformation matrix H matched with the transformation matrix H', and satisfying a least square constraint, so as to minimize the following formula:

$$\min \sum_i J(Hm_{1i}, H'm_{2i})^2$$

where, $m_{1i}=(u_1,v_1,1)$, $m_{2i}=(u_2,v_2,1)$, and J represents a cost function error, and $(u_1, v_1)$ and $(u_2, v_2)$ are a pair of matching points on original left and right images; and S1114: allowing the transformation matrix H' in step S1112 and the photographic transformation matrix H in step S1113 to respectively act on the left and right coal mine roadway images to obtain a corrected coal mine roadway image.

Further, in step S112, the process of performing coal mine roadway image enhancement processing on the corrected image obtained in step S111 by using an image enhancement algorithm based on logarithmic Log transformation includes the following steps:

S1121: based on an image logarithmic transformation formula, transforming the corrected coal mine roadway image obtained in step S111 by using a formula as follows:

$$s = c \cdot \log^{v+1}(1+v \cdot r)$$

where, r is an input grayscale of the image, $r \in [0, 1]$, s is an output grayscale of the image, c is a constant, and v is a logarithmic Log transformation intensity adjustment factor;

S1122: normalizing a logarithmically transformed coal mine roadway image obtained in step S1121 to 0-255 for transformation according to a formula as follows:

$$g = \frac{s - s_{min}}{s_{max} - s_{min}} \cdot 255$$

where, s is an unnormalized input grayscale, g is a normalized output grayscale, $s_{max}$ is a maximum grayscale of the image, and $s_{min}$ is a minimum grayscale of the image.

Further, in step S113, the process of performing image filtering processing on an enhanced image obtained in step S112 by using an image filtering algorithm based on bilateral filtering includes the following steps:

S1131: for the enhanced coal mine roadway image obtained in step S112, constructing an n*n convolution template to carry out a convolution operation;

S1132: based on a spatial area and a range area, performing weight assignment on the convolution template in step S1131 according to the following formula:

$$\begin{cases} G_\alpha(\|i - j\|) = e^{-\frac{(x_i - x_j)^2 + (y_i - y_j)^2}{2\sigma^2}} \\ G_\beta(|i - j|) = e^{-\frac{(gray(x_i,y_i) - gray(x_j,y_j))^2}{2\sigma^2}} \end{cases}$$

where, $G_a$ is a weight of the spatial area, $G_B$ is a weight of the range area, $(x_i, y_i)$, $(x_j, y_j)$ are respectively central pixel coordinates of the convolution template and pixel coordinates of the convolution template in step S1131, σ is a smoothing parameter, gray ( ) is a pixel gray value of the image, i is a center pixel of the convolution template, and j is a pixel of the convolution template;

S1133: according to the convolution template in step S1131 and the weights in step S1132, performing traversal computation of the left and right coal mine roadway images by using the following formula to obtain a filtered image:

$$\begin{cases} I_i = \frac{1}{w_i} \sum_{j \in S} G_\alpha(\||i-j\||) G_\beta(|i-j|) I_j \\ w_i = \sum_{j \in S} G_\alpha(\||i-j\||) G_\beta(|i-j|) \end{cases}$$

where, S is the convolution template in step S1131, $I_j$ is an original input image, $I_i$ is the filtered image, and $w_i$ is a normalization factor.

Further, in step S24, said using an improved particle swarm path planning method designed for the deep confined roadway includes the following steps:

S241: performing grid encoding and decoding on the grid map established based on drivable area detection in step S21 and the risk grid map established based on the projection of the drivable area of step S1 in step S22; where in consideration of the particularity of path planning in the deep confined space, according to the features of the grid map, an encoding method of a collision-free local optimal path is: $X_i$ is defined to be an obstacle-free path from a current location of a coal mine robot to a specified target point, which may be represented by all grids that constitute the path, i.e., $$X_i = \{V_1, V_2, \ldots, V_n\}$$

where, $V_i, V_2, \ldots, V_n$ represents the serial numbers of all the grids through which the path $X_i$ passes, there is no complete risk grid with a risk level of 5, and the serial numbers are not repeated mutually; and the serial numbers of the grids are continuously arranged from top to bottom and left to right by taking the first grid at the upper left corner of the grid map as 1 until the last grid at the lower right corner reaches, that is, $$V_n = \left(v_{n,1} - \frac{d}{2}\right) \times G_{row} + v_{n,2} + \frac{d}{2}$$

where, $v_{n,1}$ and $v_{n,2}$ represent a x-coordinate and y-coordinate of a current grid, which are the coordinates of a center point of the grid but not the coordinates of a vertex of the grid; d is a side length of the grid; $G_{row}$ is the number of one row of grids in the current grid map.

After path points are computed, the following formula is used during inverse solving:

$$[v_{n,1}, v_{n,2}] = \left[\mathrm{mod}(V_n - 1, G_{row}) + \frac{d}{2}, \mathrm{ceil}(V_n - 1/G_{row}) - \frac{d}{2}\right]$$

so as to complete the grid encoding and decoding;

S242: processing obstacle information according to the drivable area detection information in step S1 and the grid map established in step S21, and initializing a particle swarm population; including the following steps:

S2421: initially establishing a square matrix of which the numbers of rows and columns are both the total number $V_{overall}$ of the grid, and establishing a grid connection matrix $M_{link}$;

S24211: computing whether the current grid is adjacent to all other grids by use of cyclic traversal, and judging whether the adjacent grids are obstacles;

S24212: if the current grid is not adjacent to all other grids or the adjacent grids are obstacles, setting a corresponding matrix element to 0; and if the current grid is adjacent to all other grids and the adjacent grids are not obstacles, computing a distance between the adjacent grids by using a formula as follows:

$$Vd_{n,j} = \sqrt{(v_{n,1} - v_{i,1})^2 + (v_{n,2} - v_{i,2})^2}$$

where, $Vd_{n,i}$ is a grid distance between a grid n and a grid i, and $v_1$ and $v_2$ represent a x-coordinate and y-coordinate of the current grid;

S2422: determining a start point $V_S$ of the coal mine robot and a final target point $V_E$ thereof, and placing the two at the head and tail nodes of an initial route $X_0$ through the encoding method in step S241;

S2423: randomly selecting, from a starting node $V_S$, a next grid connected to the start point according to the connection matrix $M_{link}$ established in step 1; and S2424: repeating step S2423 according to the connection matrix $M_{link}$ until an encoding combination of a complete path connecting $V_S$ to $V_E$ is completed, and outputting an initial path;

S243: based on the grid decoding/encoding methods in S241 and the initialized population in S242, updating the velocity and location of particles in a particle swarm by using a formula as follows:

$$v_{in}^{t+1} = \{\phi_1, \phi_2, \phi_3\}$$

an improved particle velocity consists of three replacement sets. In the formula, $\Phi_1$, $\Phi_2$ and $\Phi_3$ represent three parts of the particle velocity: a self-velocity term, a cognitive term and a social term, and the last two terms are determined by a cognitive factor $c_1$, an individual historical optimal solution $pbest_i^t$, a social factor $c_2$, and a global optimal solution $gbest^t$, which is specifically as follows:

$$\phi_1 = \begin{cases} 0, & \omega < R_i \\ rand(X_i) = rand(V_1, V_2, \ldots, V_n), & \text{otherwise} \end{cases}$$

$$V_n = \mathrm{round}(rand(0,1) \times G_{row}) \times G_{col} + \mathrm{round}(rand(0,1) \times G_{col}) + d$$

$$\phi_2 = \begin{cases} \begin{cases} SN(pbest_{ij}^t), pbest_{ij}^t = x_{ij}^t \& j \neq n \\ 0, \text{otherwise} \end{cases}, & \text{otherwise} \\ 0, & c_1 < R_i \end{cases}$$

$$\phi_3 = \begin{cases} \begin{cases} SN(gbest_j^t), gbest_j^t = x_{in}^t \& j \neq n \\ 0, \text{otherwise} \end{cases}, & \text{otherwise} \\ 0, & c_1 < R_i \end{cases}$$

$$R_i = R_{min} + rand(0,1) \times (R_{max} - R_{min})$$

where, the self-velocity term is recorded by using random distribution to calculate grid coordinates and using the encoding method in step S241 to calculate corresponding grids. ω is a velocity inertia weight. $G_{col}$ is the number of one column of grids in the current grid map.

The cognitive term is recorded using the serial numbers of same positions in a set of paths $X_i$ represented by a current particle i in the individual historical optimal solution pbest$_i^t$, and part of the serial numbers are set to 0 according to a certain probability. The social term is updated by using the same strategy to obtain part of the serial numbers of the same positions in a set of paths $X_i$ represented by the current particle i and in the global optimal solution gbest$^t$. $R_i$ represents a replacement rate;

$$x_i^{t+1} = f(\text{replace}(x_i^t))$$

$$\text{replace}(x_i^t) = \text{comb}(x_i^t, v_i^{t+1}) = \text{comb}(x_i^t, [\phi_1, \phi_2, \phi_3])$$

a position update item is a fitness value of a set of paths $X_i$ represented by the current particle i. The path Xi represented by the current particle i is subjected to position replacement based on the three replacement sets in the particle velocity. $f(\bullet)$ is a fitness function, comb($\bullet$) is a permutation & combination function, and replace($\bullet$) is a replace function, indicating a replacement made between the current path $X_i$ and the particle velocity $v_i^{t+1}$; and S244: determining whether a maximum number of iterations is reached, if so, outputting an optimal autonomous obstacle avoidance path corresponding to a current end point, otherwise, returning to S243 to continue iteration.

Further, in step S243, the $\omega$ is a velocity inertia weight: in order to balance global and local search capabilities and allow the algorithm to jump out of local optimum as much as possible, an inertia weight $\omega$ is introduced into the self-velocity term of a particle update formula, and the value range thereof is between 0 and 1. The greater the inertia weight is, the stronger the global search capability is, and the weaker the local search capability is; otherwise, the global search capability is weakened, and the local search capability is enhanced. The inertia weight is designed herein as follows:

$$\omega^t = \omega_{min} + (\omega_{max} - rand() \times \omega_{min})^2 \times \left(\frac{t}{T}\right)^2$$

where, $\omega_{min}$ and $\omega_{max}$ are a minimum inertia weight and a maximum inertia weight respectively. t is a current number of iterations; and T is a maximum number of iterations.

Further, in step S243, the $f(\bullet)$ is a fitness function: the convergence of the particle swarm optimization algorithm requires the fitness function as a determination criterion, a greater fitness value of an optimization result indicates that a set of solutions represented by the particle is more preferred. Therefore, for the drivable area detection information of the deep confined roadway established in step S1, a fitness function of a particle solution is established by taking the minimization of the total line length and the minimization of risk values as optimization objectives. A relational expression of each solution in a search space thereof and an objective function is:

$$f = f(X_i, D_i, R_i) = (1 - w_R) \times \sum_{V_j = V_S}^{V_B} Vd_j + w_R \times \sum_{V_j = V_S}^{V_B} Vr_j$$

where, $f$ represents the fitness function, $$D_i = \sum_{V_j = V_S}^{V_E} Vd_j$$

represents a total length of a set of paths represented by the current particle i, $$R_i = \sum_{V_j = V_S}^{V_E} Vr_j$$

represents a risk degree of the path, $V_j$ is a j-th composition grid between a start point $V_S$ and end point $V_E$ of the path, $Vr_j$ represents the risk degree of the j-th grid, and $W_R$ represents a risk factor. A method of computing the fitness function $f$ is made by weighting the length and risk value of each grid in a path solution set $X_i$ according to risk degree indexes, adding obtained values, and taking a reciprocal of the obtained sum.

The present disclosure discloses a method for drivable area detection and autonomous obstacle avoidance of unmanned haulage equipment in deep confined spaces, which relates to the field of binocular vision and automatic driving, and is characterized by installing a binocular camera at the front of an auxiliary haulage vehicle in a deep underground space to acquire a video image of a coal mine roadway, transmitting the video image to a computer, obtaining a 3D point cloud drivable area of the coal mine roadway, providing roadway environment information support for local path planning and safety obstacle avoidance of the auxiliary haulage vehicle, establishing a risk map according to the above drivable area detection and evaluation information, and implementing an autonomous obstacle avoidance operation of the unmanned auxiliary haulage vehicle in the deep coal mine confined roadway by using an improved particle swarm optimization algorithm. The method includes the following specific steps: firstly, preprocessing a coal mine roadway image according to a Hartley image correction algorithm, an image enhancement algorithm based on logarithmic Log transformation and an image filtering algorithm based on bilateral filtering; secondly, computing a depth map of the coal mine roadway by using a SAD stereo matching algorithm based on Gaussian atrous convolution with an adaptive matching cost step size, and obtaining 3D point cloud data of the roadway; then, based on a drivable area semantic segmentation data set of the coal mine roadway, performing model fine-tuning on a deeplabv3+ semantic segmentation model pre-trained with a PASCAL VOC data set to obtain a drivable area semantic segmentation model of a 2D image of the coal mine roadway, and computing a 2D image drivable area of the coal mine roadway; next, performing 2D-image to 3D-point-cloud mapping according to a 3D point cloud of the coal mine roadway and a drivable area segmentation image of the coal mine roadway so as to obtain a 3D point cloud drivable area of the coal mine roadway; then, establishing a 2D grid map and a risk map according to the projection of the above drivable area detection and safety assessment information, and intercepting a map with an appropriate length for autonomous obstacle avoidance planning of a current auxiliary haulage vehicle; next, by taking a current position of the unmanned auxiliary haulage vehicle as a start point, recording a grid that can be used as a local end point into a table of end points to be selected; then, performing autonomous obstacle avoidance path planning by using an improved particle swarm path planning method designed for the deep confined roadway; then, obtaining an optimal end point to be selected of a driving path by using a greedy strategy, and enabling the unmanned auxiliary haulage vehicle to drive according to the optimal end point and an optimal path; and finally, repeating the steps of map interception and autonomous obstacle avoidance planning until the unmanned auxiliary haulage vehicle arrives at a task destination. The present disclosure has the features that: according to the present disclosure, by using a binocular vision-based method for drivable area detection of deep coal mine confined roadways and a method for autonomous obstacle avoidance of an unmanned auxiliary haulage vehicle based on an improved particle swarm optimization algorithm, the active acquisition of images of a coal mine roadway is achieved by means of a single camera sensor device, so that a 3D spatial drivable area of the auxiliary haulage vehicle in a deep underground space can be computed stably, accurately and quickly; and the autonomous obstacle avoidance driving of the unmanned auxiliary haulage vehicle in the deep confined roadway is completed according to drivable area detection and safety assessment information, and therefore, the method has important significance for the implementation of an automatic driving technology of an auxiliary haulage vehicle for coal mines.

The present disclosure has the beneficial effects that:

(1) the present disclosure provides a method for drivable area detection and autonomous obstacle avoidance of unmanned haulage equipment in deep confined spaces, which can effectively utilize the information of a deep confined roadway collected by a binocular camera and a drivable area based on safety state assessment to perform autonomous obstacle avoidance in combination with a particle swarm optimization algorithm improved for path planning, so as to realize the unmanned driving of an auxiliary haulage vehicle for coal mines in a deep confined space.

(2) The present disclosure puts forward an image enhancement algorithm based on logarithmic Log transformation and an image preprocessing method based on an image filtering algorithm using bilateral filtering, which improves the visibility of a coal mine roadway in a deep underground space, and avoids the influence of dust and salt & pepper noise.

(3) The present disclosure puts forward a SAD stereo matching algorithm based on Gaussian atrous convolution with an adaptive aggregation step size, which effectively improves the stereo matching precision and efficiency of left and right coal mine roadway images, and can accurately and quickly obtain a depth image of the coal mine roadway.

(4) The present disclosure puts forward a method for mapping a semantic segmentation image of a 2D drivable area of the coal mine roadway to a 3D point cloud drivable area of the coal mine roadway, which can directly obtain the 3D point cloud drivable area of the coal mine roadway from a binocular image without using expensive devices such as a radar and the like, thus, tedious processes such as image and LIDAR calibration and the like are avoided, and the efficiency of system operation is improved; and the obtained point cloud has richer texture information.

(5) The present disclosure puts forward an autonomous obstacle avoidance method for an unmanned auxiliary haulage vehicle based on an improved particle swarm optimization algorithm, which can effectively utilize drivable area detection information, and quickly and autonomously perform autonomous obstacle avoidance of the unmanned auxiliary haulage vehicle, thereby improving the security and intelligence of local path planning of the vehicle.

DETAILED DESCRIPTION OF THE EMBODIMENTS

The present disclosure will now be further described in detail with reference to the accompanying drawings.

It should be noted that the terms such as "upper", "lower", "left", "right", "front", "rear" and the like referred to in the present disclosure are used only for the clarity of description and are not intended to limit the scope of the present disclosure, and any changes and adjustments to the relative relations thereof should also be deemed to fall within the implementable scope of the present disclosure without substantially changing the technical content.

Figure 1:
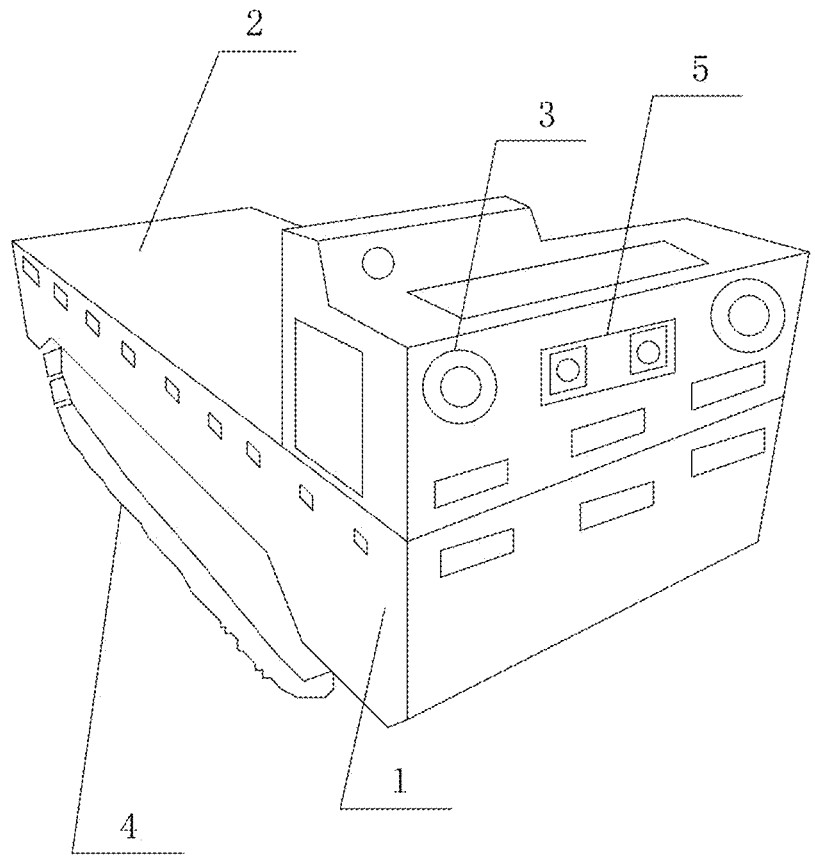
FIG. 1 is a schematic diagram of an application of an auxiliary haulage vehicle in a method for drivable area detection and autonomous obstacle avoidance of unmanned haulage equipment in deep confined spaces according to an embodiment of the present disclosure; Reference numerals in FIG. 1: 1-body of an auxiliary haulage vehicle for coal mines; 2-standard container of the auxiliary haulage vehicle for coal mines; 3-explosion-proof vehicle lamp of the auxiliary haulage vehicle for coal mines; 4-track of the auxiliary haulage vehicle for coal mines; and 5-explosion-proof binocular camera.

FIG. 1 is a schematic diagram of an application of an auxiliary haulage vehicle in a deep underground space in a method for drivable area detection and autonomous obstacle avoidance of unmanned haulage equipment in deep confined spaces according to the present disclosure. A track 4 of an auxiliary haulage vehicle for coal mines is disposed below a body 1 of the auxiliary haulage vehicle for coal mines and carries the body of the auxiliary haulage vehicle for coal mines to move. An anti-explosion binocular camera 5 is disposed at the front end of the body 1 of the auxiliary haulage vehicle for coal mines, and configured to collect real-time video images of a coal mine roadway, and perform background processing on videos of the coal mine roadway to obtain a 3D point cloud drivable area of the coal mine roadway, so as to provide roadway environment information for path planning and safety obstacle avoidance of the auxiliary haulage vehicle. An explosion-proof vehicle lamp 3 of the auxiliary haulage vehicle for coal mines is disposed on one side of the anti-explosion binocular camera 5, which can not only illuminate the surrounding environment, but also improve the image shooting quality.

Figure 2:
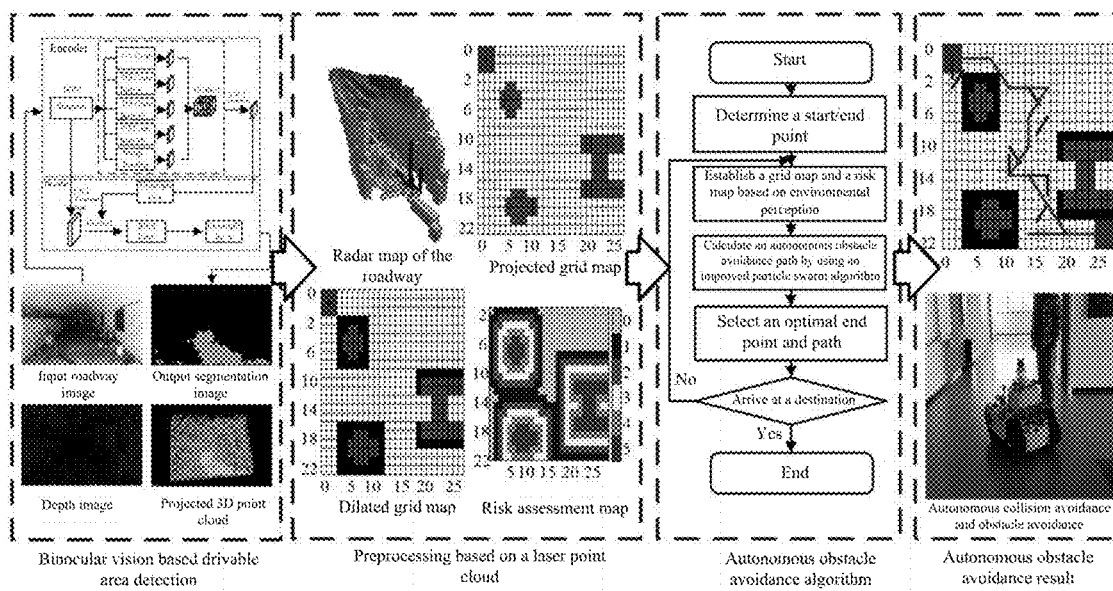
FIG. 2 is an example diagram of a drivable area detection and autonomous obstacle avoidance process of unmanned haulage equipment in a deep underground confined space according to the embodiment of the present disclosure.
Figure 3:
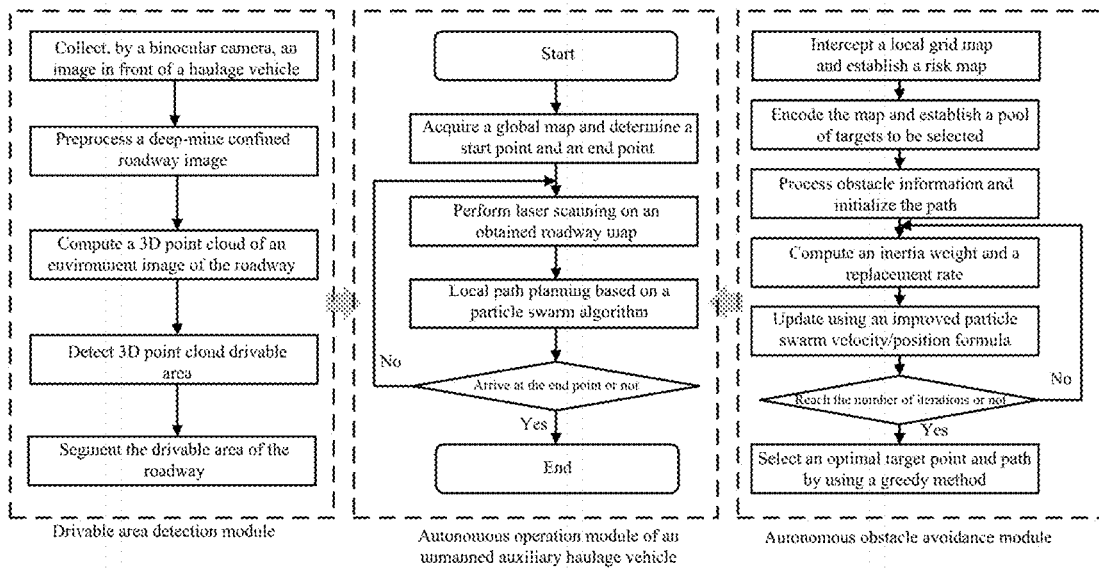
FIG. 3 is a flowchart of a method for drivable area detection and autonomous obstacle avoidance of unmanned haulage equipment in a deep confined space according to the embodiment of the present disclosure.

The present disclosure provides a method for drivable area detection and autonomous obstacle avoidance of unmanned haulage equipment in deep confined spaces, which, in combination with FIG. 2 and FIG. 3, contains two parts: drivable area detection of a coal mine roadway based on binocular vision and autonomous obstacle avoidance based on an improved particle swarm optimization algorithm. The method specifically includes the following steps:

Step 1: Environmental Perception is Performed by Use of Binocular Vision, and a Drivable Area of an Unmanned Auxiliary Haulage Vehicle in a Deep Coal Mine Roadway is Detected.

Figure 4:
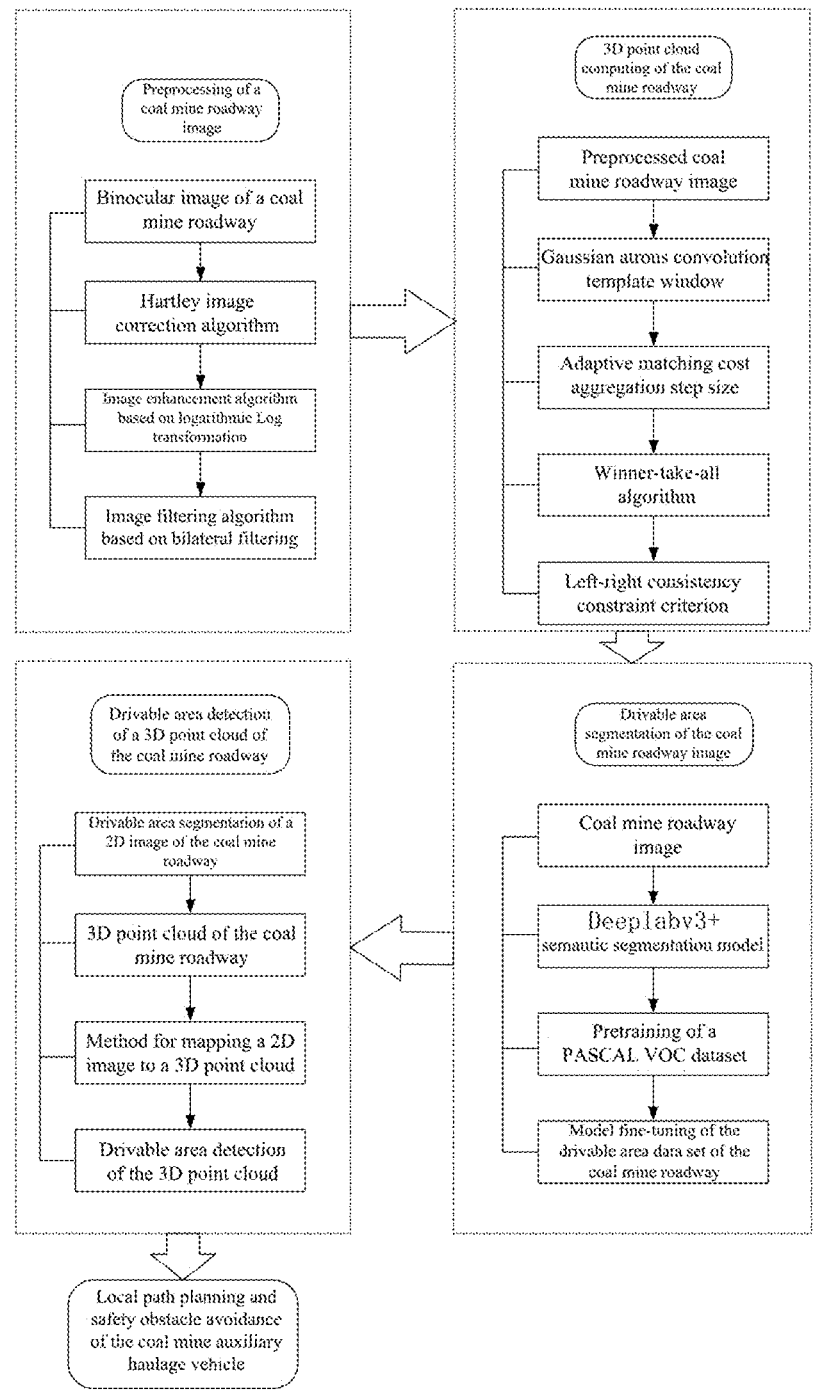
FIG. 4 is a flowchart of a method for drivable area detection of a coal mine roadway based on binocular vision according to the embodiment of the present disclosure.

Exemplarily, in combination with FIG. 4, in step 1, four modules of preprocessing a coal mine roadway image, performing stereo matching on the image to obtain a depth map, performing drivable area semantic segmentation of a 2D image, and mapping to a 3D point cloud drivable area are included, specifically including the following steps:

Step 1-1: A Binocular Camera Collects a Video Image of the Auxiliary Haulage Vehicle Driving in the Coal Mine Roadway, and a Coal Mine Roadway Image is Preprocessed.

Exemplarily, in step 1-1, the process of preprocessing a coal mine roadway image includes the following substeps:

step 1-1-1: coal mine roadway image correction processing is performed by using a Hartley image correction algorithm;

step 1-1-2: image enhancement processing is performed on a corrected image obtained in step 1-1-1 by using an image enhancement algorithm based on logarithmic Log transformation; and step 1-1-3: image filtering processing is performed on an enhanced image obtained in step 1-1-2 by using an image filtering algorithm based on bilateral filtering.

Each substep of step 1-1 is described below.

(I) Coal Mine Roadway Image Correction Processing

The Hartley image correction algorithm used in step 1-1-1 specifically includes:

step 1-1-1-1: an epipolar constraint relationship of the left and right coal mine roadway images is obtained according to a camera calibration algorithm, and epipolar points p and p' in the left and right coal mine roadway images are found;

step 1-1-1-2: a transformation matrix H' mapping p' to an infinity point $(1, 0, 0)^T$ is computed;

step 1-1-1-3: a photographic transformation matrix H matched with the transformation matrix H' is computed, and a least square constraint is satisfied so as to minimize the following formula:

$$\min \sum_i J(Hm_{1i}, H'm_{2i})^2$$

where, $m_{1i}=(u_1, v_1, 1)$, $m_{2i}=(u_2, v_2, 1)$, and J represents a cost function error, and $(u_1, v_1)$ and $(u_2, v_2)$ are a pair of matching points on original left and right images; and step 1-1-1-4: the transformation matrix H' in step 1-1-1-2 and the photographic transformation matrix H in step 1-1-1-3 respectively act on the left and right coal mine roadway images to obtain a corrected coal mine roadway image.

(II) Image Enhancement Processing

The image enhancement algorithm in step 1-1-2 specifically includes:

step 1-1-2-1: based on an image logarithmic Log transformation formula, the corrected coal mine roadway image obtained in step 1-1-1 is transformed by using a formula as follows:

$$s = c \cdot \log_{v+i}(1+v \cdot r)$$

where, r is an input grayscale of the image, $r \in [0, 1]$, s is an output grayscale of the image, c is a constant, and v is a logarithmic Log transformation intensity adjustment factor; and step 1-1-2-2: a logarithmically transformed coal mine roadway image obtained in step 1-1-2-1 is normalized to 0-255 for transformation by using a formula as follows:

$$g = \frac{s - s_{min}}{s_{max} - s_{min}} \cdot 255$$

where, s is an unnormalized input grayscale, g is a normalized output grayscale, $S_{max}$ is a maximum grayscale of the image, and $S_{min}$ is a minimum grayscale of the image.

(III) Image Filtering Processing

The image filtering algorithm in step 1-1-3 specifically includes:

step 1-1-3-1: for the enhanced coal mine roadway image obtained in step 1-1-2, an n*n convolution template is constructed to carry out a convolution operation;

step 1-1-3-2: based on a spatial area and a range area, weight assignment is performed on the convolution template in step 1-1-3-1 by using a formula as follows:

$$\begin{cases} G_\alpha(\|i-j\|) = e^{\frac{(x_i-x_j)^2+(y_i-y_j)^2}{2\sigma^2}} \\ G_\beta(\|i-j\|) = e^{\frac{(gray(x_i-y_i)-gray(x_j,y_j))^2}{2\sigma^2}} \end{cases}$$

where, $G_\alpha$ is a weight of the spatial area, $G_\beta$ is a weight of the range area, $(x_i, yi)$, $(x_j, y_j)$ are respectively central pixel coordinates of the convolution template and pixel coordinates of the convolution template in step 1-1-3-1, σ is a smoothing parameter, gray ( ) is a pixel gray value of the image, i is a center pixel of the convolution template, and j is a pixel of the convolution template; and step 1-1-3-3: according to the convolution template in step 1-1-3-1 and the weights in step 1-1-3-2, traversal computation of the left and right coal mine roadway images is performed by using the following formula to obtain a filtered image:

$$\begin{cases} I_i = \frac{1}{w_i} \sum_{j \in S} G_\alpha(\|i-j\|)G_\beta(\|i-j\|)I_j \\ w_i = \sum_{j \in S} G_\alpha(\|i-j\|)G_\beta(\|i-j\|) \end{cases}$$

where, S is the convolution template in step 1-1-3-1, is an original input image, $I_i$ is the filtered image, and $w_i$ is a normalization factor.

Step 1-2: For a Preprocessed Coal Mine Roadway Image Obtained in Step 1, a Stereo Matching Algorithm Specific to a Stereo Matching Task of the Coal Mine Roadway is Designed to Implement the Generation of a Depth Map of the Coal Mine Roadway and the Computation of 3D Point Cloud Data.

Figure 6:
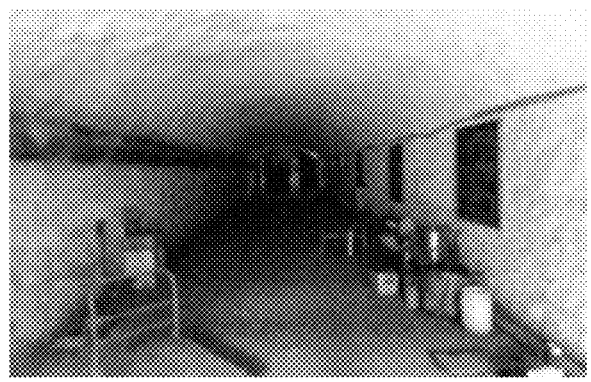
FIG. 6 is a left coal mine roadway image.
Figure 7:
FIG. 7 is a depth map of the coal mine roadway.

The process of the generation of a depth map of the coal mine roadway and the computation of 3D point cloud data in step 1-2 specifically includes the following substeps:

step 1-2-1: an atrous convolution window with a specification of 5*5 is constructed, and different weights are assigned to different positions of the window according to a 2D Gaussian distribution function, where the weights in a sequence from left to right and top to bottom are respectively 3, 0, 21, 0, 3, 0, 0, 0, 0, 0, 21, 0, 1, 0, 21, 0, 0, 0, 0, 0, 3, 0, 21, 0, 3;

step 1-2-2: a left view of the coal mine roadway image is covered with the convolution window constructed in step 1-2-1, and pixel points in all coverage areas are selected;

step 1-2-3: a right view of the coal mine roadway image is covered with the convolution window constructed in step 1-2-1, and pixel points in all coverage areas are selected;

step 1-2-4: an absolute value of a gray value difference of all corresponding pixel points in the convolution window coverage areas of the left and right coal mine roadway views in step 1-2-2 and step 1-2-3 is found, and according to the weights of the different positions of the window in step 1-2-1, weighted summation is performed on the weights as a matching cost by using a formula as follows:

$$C_{matching\ cost}(p, d) = \sum_{q \in N_p} \left( |I^L(q) - I^R(qd)| \cdot w_q \right)$$

where, p is a pixel of the coal mine roadway image, d is a disparity of the coal mine roadway image, $I^L(q)$ and $I^R(qd)$ are window elements taking q and qd as image centers on the left and right coal mine roadway images respectively, w q is the weight of the different positions of the convolution window, and N p is a 5*5 Gaussian atrous convolution window;

step 1-2-5: matching cost aggregation is performed according to a matching cost computation method in step 1-2-4, where a matching cost aggregation step size d step is adaptively changed according to a pixel luminance of the coal mine roadway image by using a formula as follows:

$$d_{step} = \frac{D_{max} - 1}{G_{max} - G_{min}} \cdot g + \frac{G_{max} - G_{min}D_{max}}{G_{max} - G_{min}}$$

where, $D_{max}$ is a maximum disparity of a binocular image of the coal mine roadway, $G_{max}$ and $G_{min}$ are a maximum gray value and a minimum gray value of a gray image of the coal mine roadway respectively, and g is a gray value of the gray image of the coal mine roadway;

step 1-2-6, based on matching costs in an adaptive matching cost aggregation step size $d_{step}$ range obtained in step 1-2-5, a window with a minimum matching cost value is found as a disparity by using a winner-take-all (WTA) algorithm, and cyclic computation is performed to obtain disparity maps of the coal mine roadway;

step 1-2-7: based on the disparity maps of the coal mine roadway obtained in step 1-2-6, disparity image optimization is performed in accordance with a left-right consistency constraint criterion by using a formula as follows:

$$D = \begin{cases} D_l & \text{if } |D_l - D_r| \le 1 \\ D_{invalid} & \text{otherwise} \end{cases}$$

where, $D_l$ is a left disparity map, $D_r$ is a right disparity map, and $D_{invalid}$ is an occlusion point where no disparity exists; and step 1-2-8, based on a disparity optimization image of the coal mine roadway obtained in step 1-2-7, disparity-map to 3D-data computation is performed according to a binocular stereo vision principle, and 3D point cloud information ($X_w$, $Y_w$, $Z_w$) of the coal mine roadway in the advancing direction of the unmanned haulage vehicle is obtained by using a formula as follows:

$$\begin{cases} X_w(x, y) = \dfrac{b \cdot f \cdot (x - u)}{\alpha \cdot d(x, y)} \\ Y_w(x, y) = \dfrac{b \cdot f \cdot (y - v)}{\beta \cdot d(x, y)} \\ Z_w(x, y) = \dfrac{b \cdot f}{d(x, y)} \end{cases}$$

where, b is a distance between left and right optical centers of a binocular camera, $f$ is a focal distance of the camera, d is a disparity of the coal mine roadway image, (x, y) indicates pixel coordinates of coal mine roadway image, (u, v) indicates coordinates of an origin of an image coordinate system in a pixel coordinate system, and $\alpha$ and $\beta$ are the focal distances of a pixel in the x and y directions of an image plane respectively. FIG. 6 is a left coal mine roadway image. FIG. 7 is a depth map of the coal mine roadway.

Step 1-3, for the Preprocessed Coal Mine Roadway Image Obtained in Step 1-1, a Deep Learning Model for a Semantic Segmentation Task of the Coal Mine Roadway is Designed to Implement the Drivable Area Semantic Segmentation of a 2D Image of the Coal Mine Roadway.

The process of drivable area semantic segmentation of a 2D image of the coal mine roadway in step 1-3 specifically includes:

step 1-3-1: a semantic segmentation data set of the coal mine roadway is made, which specifically includes:

step 1-3-1-1: marking is performed by using labelme image marking software, and the labelme software is started;

step 1-3-1-2: a coal mine roadway image folder is opened, and an image is selected;

step 1-3-1-3: only the drivable area of the coal mine roadway is selected with a frame, and the drivable area is named drivable area; and step 1-3-1-4: steps 1-3-1-2 and 1-3-1-3 are repeated to finally complete the making of the drivable area semantic segmentation data set of the 2D image of the coal mine roadway.

Step 1-3-2: a semantic segmentation model deeplabv3+ model is pre-trained based on a PASCAL VOC data set. The PASCAL VOC data set used in this embodiment contains a total of 11,530 images in 20 types.

Figure 5:
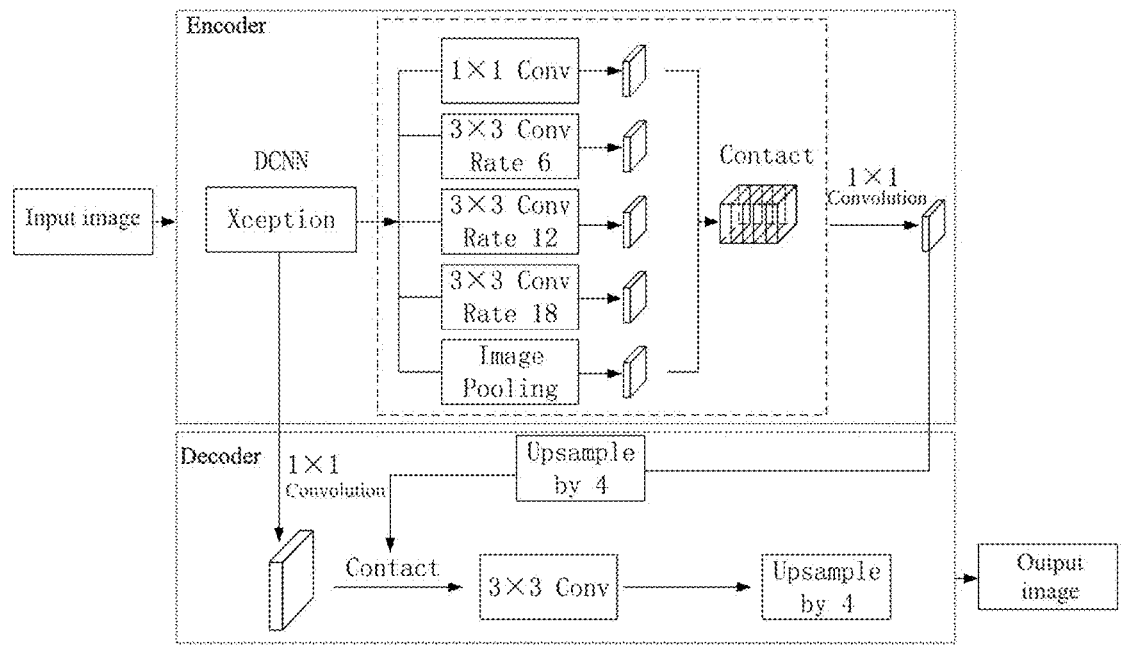
FIG. 5 is a network diagram of deep learning semantic segmentation model deeplabv3+.

Step 1-3-3: the transfer learning and fine-tuning training of the deeplabv3+ semantic segmentation model is performed according to a pre-trained semantic segmentation model obtained in step 1-3-2 and the drivable area semantic segmentation data set of the coal mine roadway obtained in step 1-3-1. FIG. 5 is a network diagram of the deep learning semantic segmentation model deeplabv3+.

Figure 8:
FIG. 8 is a segmentation diagram of a 2D image drivable area of the coal mine roadway.

Step 1-3-4, real-time drivable area semantic segmentation of the 2D image of the coal mine roadway is performed according to the deep learning model fine-tuned with the data set of the coal mine roadway obtained in step 1-3-3 to obtain a 2D image drivable area. FIG. 8 is a segmentation diagram of the 2D image drivable area of the coal mine roadway.

Step 1-4: According to the 3D Point Cloud Data of the Coal Mine Roadway Obtained in Step 1-2 and a 2D Drivable Area Segmentation Image of the Coal Mine Roadway Obtained in Step 1-3, a 2D-Image to 3D-Point-Cloud Mapping Method is Designed to Implement the Semantic Segmentation of a 3D Point Cloud of the Coal Mine Roadway.

The process of semantic segmentation of a 3D point cloud of the coal mine roadway in step 1-4 specifically includes:
step 1-4-1, according to the 2D image drivable area obtained in step 1-3-4, drivable area image processing is performed based on morphological opening operation, which specifically includes:
step 1-4-1-1: a morphological erosion operation is performed according to the drivable area image of the coal mine roadway obtained in step 1-3-4; and
step 1-4-1-2: a morphological dilation operation is performed according to a morphological erosion image obtained in step 1-4-1-1.

Figure 9:
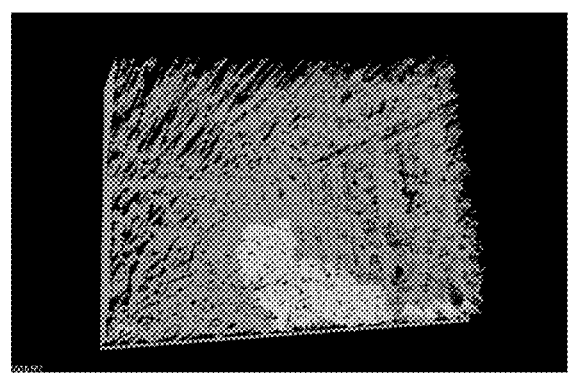
FIG. 9 is a detection diagram of a 3D point cloud drivable area of the coal mine roadway.

Step 1-4-2: according to a left coal mine roadway view of the unmanned auxiliary haulage vehicle, segmentation for mapping the 2D image drivable area obtained in step 1-3-4 to the 3D point cloud is performed to obtain a 3D point cloud drivable area of the coal mine roadway by using a formula as follows:

$$P(x, y, z) = \begin{cases} P(x, y, z) & (x, y) \in I(x, y) \\ 0 & (x, y) \notin I(x, y) \end{cases}$$

where, P (x, y, z) is the 3D point cloud data of the coal mine roadway obtained in step 1-2-8, I (x, y) is a drivable area image of the coal mine roadway obtained after morphological processing is performed in step 1-4-1, and (x, y) is pixel coordinates of the left coal mine roadway view collected by the binocular camera. FIG. 9 is a detection diagram of the 3D point cloud drivable area of the coal mine roadway.

Step 2: A Drivable Area of a Deep Confined Roadway is Determined According to Drivable Area Detection Information in Step 1, and the Safe Driving of the Unmanned Auxiliary Haulage Vehicle in the Deep Confined Roadway is Performed by Using an Autonomous Obstacle Avoidance Algorithm Based on an Improved Particle Swarm Optimization Algorithm.

Exemplarily, in step 2, four modules of establishing an environment map, initializing basic data, planning autonomous obstacle avoidance, and outputting an optimal route are included, which specifically includes the following substeps:

Step 2-1, a 2D Workspace Grid Map of the Unmanned Auxiliary Haulage Vehicle is Established Based on the Drivable Area Detection Information in Step 1.

The deep confined roadway is affected by deformation energy, kinetic energy and driving stress of coal mining for a long time, so part of the roadway shows an overall convergence trend, and has situations of roof leakage at the top of the roadway, hanging-down of blanket nets, damage, leakage and cracking on both sides of the roadway, deformation of support materials, and more water puddles on the ground surface of the roadway, and the like. The 2D grid map is obtained based on the projection of scene reconstruction information in step 1, and includes deformation and roof leakage of blanket nets and support materials at the top of the roadway, deformation, destruction, leakage and cracking on both sides of the deep roadway, and water puddles and other obstacles on the ground surface of the roadway.

Step 2-2: A Risk Grid Map is Established According to the Projection of the Drivable Area in Step 1.

Figure 10:
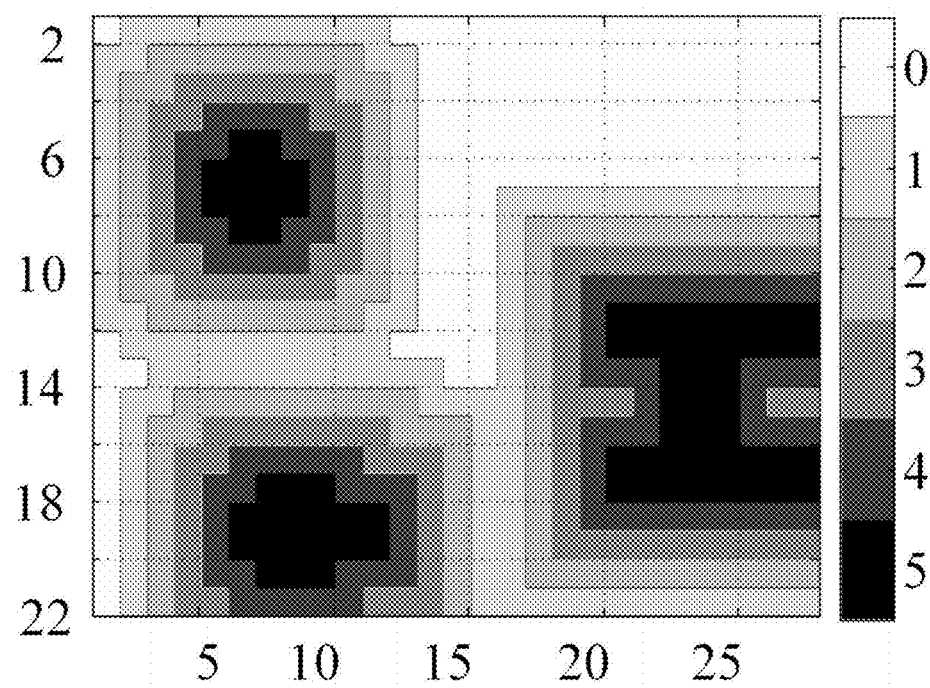
FIG. 10 is a risk map of a deep coal mine confined roadway established according to a drivable area detection method.

The map obtained by performing safety assessment on the deep confined roadway by using an image segmentation technology in step 1 contains a safety area, a partial safety area and a complete risk area; the safety area is a part of the drivable area in step 1, in which the unmanned auxiliary haulage vehicle is allowed to drive directly; the complete risk area is an undrivable area, in which the unmanned auxiliary haulage vehicle is completely not allowed to drive; the partial safety area is a drivable area obtained by segmenting in step 1 between the safety area and the undrivable area, in which there is a risk when the unmanned auxiliary haulage vehicle drives; and in autonomous obstacle avoidance planning, a driving route of the vehicle should be planned in the safety area as much as possible, and cannot be planned in a safety risk area, and under a certain condition, the driving route of the vehicle can be planned in the partial safety area, but should be far away from the complete risk area as much as possible; and a rule of establishment among the three kinds of areas is as follows:
rule 2-2-1: area risk levels are established according to the drivable area of the vehicle obtained by segmenting in step 1: the undrivable area itself is at a highest level 5; eight neighbor grids of a current grid are set to be at a risk level 4 by taking a grid where the undrivable area is located as a reference point; repeating is performed in a similar fashion until a risk level 1 reaches; the risk levels of other grids that are not at risk are still 0, that is, they are fully passable;
rule 2-2-2: if there is a conflict in the risk level of a grid, the grid with the conflict is assessed with the highest risk level; and
rule 2-2-3: the undrivable area itself is an absolute complete risk area, in which vehicles are not allowed to drive, and the safety area and the partial safety area (risk levels 1-4) are both drivable areas, where a grid with the risk level of 0 is a safety area; FIG. 10 is a risk map of a deep coal mine confined roadway established according to a drivable area detection method.

Step 2-3: Maps with an Appropriate Length are Intercepted, and a Temporary Table of End Points to be Selected is Established Based on the Map Established Based on the Drivable Area Detection Information.

To ensure the real-time performance of autonomous obstacle avoidance, maps with an appropriate length needs to be continuously intercepted for planning so as to update an autonomous obstacle avoidance path during vehicle driving. After the map is intercepted, a grid allowed to serve as a local end point is selected in the map by taking the unmanned auxiliary haulage vehicle as a start point of the current map, and recorded into a table of end points to be selected in accordance with a rule as follows:

rule 2-3-1: an end point to be selected must be in the last column of a local grid map;
rule 2-3-2: the grid is not an obstacle grid;
rule 2-3-3: the neighbor grids of the end point to be selected at least comprise one passable grid; and
rule 2-3-4: the grid is not surrounded by obstacles.

Step 2-4: Autonomous Obstacle Avoidance Path Planning is Performed by Using an Improved Particle Swarm Path Planning Method Designed for the Deep Confined Roadway.

The improved particle swarm path planning method designed for the deep confined roadway in step 2-4 specifically includes:

step 2-4-1: grid encoding and decoding is performed on the grid map established based on drivable area detection in step 2-1 and the risk grid map established based on the projection of the drivable area of step 1 in step 2-2; where in consideration of the particularity of path planning in the deep confined space, according to the features of the grid map, an encoding method of a collision-free local optimal path is: $X_i$ is defined to be an obstacle-free path from a current location of a coal mine robot to a specified target point, which may be represented by all grids that constitute the path, i.e., $$X_i = \{V_1, V_2, \ldots, V_n\}$$

where, $V_1, V_2, \ldots V_n$ represents the serial numbers of all the grids through which the path $X_i$ passes, there is no complete risk grid with a risk level of 5, and the serial numbers are not repeated mutually. The serial numbers of the grids are continuously arranged from top to bottom and left to right by taking the first grid at the upper left corner of the grid map as 1 until the last grid at the lower right corner reaches, that is, $$V_n = \left(v_{n,1} - \frac{d}{2}\right) \times G_{row} + v_{n,2} + \frac{d}{2}$$

where, $v_{n,1}$ and $v_{n,2}$ represent a x-coordinate and a y-coordinate of a current grid, which are the coordinates of a center point of the grid but not the coordinates of a vertex of the grid; d is a side length of the grid; $G_{row}$ is the number of one row of grids in the current grid map. After path points are computed, the following formula is used during inverse solving:

$$[v_{n,1}, v_{n,2}] = \left[\mod(V_n - 1, G_{row}) + \frac{d}{2}, \text{ceil}(V_n - 1/G_{row}) - \frac{d}{2}\right]$$

so as to complete the grid encoding and decoding.

step 2-4-2: obstacle information is processed according to the drivable area detection information in step 1 and the grid map established in step 2-1, and a particle swarm population is initialized, which includes the following steps:

step 2-4-2-1: a square matrix of which the numbers of rows and columns are both the total number $V_{overall}$ of the grid is initially established, and a grid connection matrix $M_{link}$ is established;

step 2-4-2-1-1: whether the current grid is adjacent to all other grids by use of cyclic traversal is computed, and whether the adjacent grids are obstacles is judged;

step 2-4-2-1-2: if the current grid is not adjacent to all other grids or the adjacent grids are obstacles, a corresponding matrix element is set to 0; and if the current grid is adjacent to all other grids and the adjacent grids are not obstacles, a distance between the adjacent grids is computed by using a formula as follows:

$$Vd_{n,i} = \sqrt{(v_{n,1} - v_{i,1})^2 + (v_{n,2} - v_{i,2})^2}$$

where, $Vd_{n,i}$ is a grid distance between the grid n and the grid i, and $v_1$ and $v_2$ represent a x-coordinate and y-coordinate of the current grid;

step 2-4-2-2: a start point $V_S$ of the coal mine robot and a final target point $V_E$ thereof are determined, and placed at the head and tail nodes of an initial route $X_0$ through the encoding method in step 2-4-1;

step 2-4-2-3: a next grid connected to the start point is randomly selected starting from a starting node $V_S$ according to the connection matrix $M_{link}$ established in step 1; and step 2-4-2-4: step 2-4-2-3 is repeated according to the connection matrix $M_{link}$ until an encoding combination of a complete path connecting $V_S$ to $V_E$ is completed, and an initial path is output.

step 2-4-3: based on the grid decoding/encoding methods in step 2-4-1 and the initialized population in step 2-4-2, the velocity and location of particles in a particle swarm are updated by using a formula as follows:

$$v_{in}^{t+1} = \{\phi_1, \phi_2, \phi_3\}$$

an improved particle velocity consists of three replacement sets. In the formula, $\Phi^1$, $\Phi^2$ and $\Phi^3$ represent three parts of the particle velocity: a self-velocity term, a cognitive term and a social term, and the last two terms are determined by a cognitive factor $c_1$, an individual historical optimal solution $pbest_i^t$, a social factor $c_2$, and a global optimal solution $gbest^t$, which is specifically as follows:

$$\phi_1 = \begin{cases} 0, & \omega < R_i \\ \text{rand}(X_i) = \text{rand}(V_1, V_2, \ldots, V_n), & \text{otherwise} \end{cases}$$

$$V_n = \text{round}(\text{rand}(0, 1) \times G_{row}) \times G_{col} + \text{round}(\text{rand}(0, 1) \times G_{col}) + d$$

$$\phi_2 = \begin{cases} \begin{cases} SN(pbest_{ij}^t), & pbest_{ij}^t = x_{in}^t \& j \neq n \\ 0, & \text{otherwise} \end{cases}, & \text{otherwise} \\ 0, & c_1 < R_i \end{cases}$$

$$\phi_3 = \begin{cases} \begin{cases} SN(gbest_j^t), & gbest_j^t = x_{in}^t \& j \neq n \\ 0, & \text{otherwise} \end{cases}, & \text{otherwise} \\ 0, & c_1 < R_i \end{cases}$$

$$R_i = R_{min} + \text{rand}(0, 1) \times (R_{max} - R_{min})$$

where, the self-velocity term is recorded by using random distribution to calculate grid coordinates and using the encoding method in step 2-4-1 to calculate corresponding grids. $G_{col}$ is the number of one column of grids in the current grid map. The cognitive term is recorded using the serial numbers of same positions in a set of paths $X_i$ represented by a current particle i in the individual historical optimal solution $pbest_i^t$, and part of the serial numbers are set to 0 according to a certain probability. The social term is updated by using the same strategy to obtain part of the serial numbers of the same positions in a set of paths $X_i$ represented by the current particle i and the global optimal solution gbest$^t$.

$\omega$ is a velocity inertia weight. In order to balance global and local search capabilities and allow the algorithm to jump out of local optimum as much as possible, an inertia weight $\omega$ is introduced into the self-velocity term of a particle update formula, and the value range thereof is between 0 and 1. The greater the inertia weight is, the stronger the global search capability is, and the weaker the local search capability is; otherwise, the global search capability is weakened, and the local search capability is enhanced. The inertia weight is designed herein as follows:

$$\omega^t = \omega_{min} + (\omega_{max} - \text{rand}() \times \omega_{min})^2 \times \left(\frac{t}{T}\right)^2$$

where, $\omega_{min}$ and $\omega_{max}$ are a minimum inertia weight and a maximum inertia weight. t is a current number of iterations. T is a maximum number of iterations.

$R_i$ represents a replacement rate.

$$x_i^{t+1} = f(\text{replace}(x_i^t))$$

$$\text{replace}(x_i^t) = \text{comb}(x_i^t, v_i^{t+1}) = \text{comb}(x_i^t, \{\phi_1, \phi_2, \phi_3\})$$

A position update item is a fitness value of a set of paths $X_i$ represented by the current particle i. The path $X_i$ represented by the current particle i is subjected to position replacement based on the three replacement sets in the particle velocity. comb(•) is a permutation & combination function. replace(•) is a replace function, indicating a replacement made between the current path $X_i$ and the particle velocity $v_i^{t+1}$. $f(•)$ is a fitness function.

The convergence of the particle swarm optimization algorithm requires the fitness function as a determination criterion, a greater fitness value of an optimization result indicates that a set of solutions represented by the particle is more preferred. Therefore, for the drivable area detection information of the deep confined roadway established in step S1, a fitness function of a particle solution is established by taking the minimization of the total line length and the minimization of risk values as optimization objectives. A relational expression of each solution in a search space thereof and an objective function is:

$$f = f(X_i, D_i, R_i) = (1 - w_R) \times \sum_{V_j=V_S}^{V_E} Vd_j + w_R \times \sum_{V_j=V_S}^{V_E} Vr_j$$

where, $f$ represents a fitness function, $$D_l = \sum_{V_j=V_S}^{V_E} Vd_j$$

represents a total length of a set of paths represented by the current particle i, $$R_j = \sum_{V_j=V_S}^{V_S} Vr_j$$

represents a risk degree or the path, $V_j$ is a j-th composition grid between a start point $V_S$ and end point $V_E$ of the path, $Vr_j$ represents the risk degree of the j-th grid, and $W_R$ represents a risk factor; and a method of computing the fitness function $f$ is made by weighting the length and risk value of each grid in a path solution set $X_i$ according to risk degree indexes, adding obtained values, and taking a reciprocal of the obtained sum.

step 2-4-4: whether a maximum number of iterations is reached is determined, if so, an optimal autonomous obstacle avoidance path corresponding to a current end point is output, otherwise, step 2-4-3 is returned to continue iteration.

Step 2-5: An Optimal End Point to be Selected of a Driving Path is Obtained by Using a Greedy Strategy, and the Unmanned Auxiliary Haulage Vehicle is Enabled to Drive According to the Optimal End Point and an Optimal Path.

Step 2-6: Steps 2-1 to 2-5 are Repeated to Complete the Autonomous Obstacle Avoidance of the Unmanned Auxiliary Haulage Vehicle in the Deep Confined Roadway Until the Unmanned Auxiliary Haulage Vehicle Arrives at a Task Destination.

In summary, the present disclosure provides a method for drivable area detection and autonomous obstacle avoidance of unmanned haulage equipment in deep confined spaces, which can effectively utilize the information of a deep confined roadway collected by a binocular camera and a drivable area based on safety state assessment to perform autonomous obstacle avoidance in combination with a particle swarm optimization algorithm improved for path planning, so as to realize the unmanned driving of an auxiliary haulage vehicle for coal mines in a deep confined space; a method for drivable area detection of a deep confined space based on binocular vision performs coal mine roadway image preprocessing by using a Hartley image correction algorithm, an image enhancement algorithm based on logarithmic Log transformation, and an image filtering algorithm based on bilateral filtering, so that the problems such as dim environment and large salt & pepper noise of the deep underground coal mine roadway are solved; a SAD stereo matching algorithm based on Gaussian atrous convolution with an adaptive aggregation step size is used, which improves the matching precision and matching efficiency of the left and right coal mine roadway images; a model transfer-based method for training the semantic segmentation model of the drivable area of the coal mine roadway is used, which solves the problem of lack of data sets of the coal mine roadway, thereby improving the robustness and generalization of the semantic segmentation model; a semantic segmentation method of the point cloud of the coal mine roadway based on 2D-image to 3D-point-cloud mapping is used, which solves a problem of expensiveness caused by radar equipment, improves the semantic segmentation accuracy and efficiency of the 3D point cloud, and can obtain rich texture information of the coal mine roadway; and the method for autonomous obstacle avoidance of the unmanned auxiliary haulage vehicle based on the improved particle swarm optimization algorithm can effectively utilize the drivable area detection information, and quickly and autonomously perform the autonomous obstacle avoidance of the unmanned auxiliary haulage vehicle, thereby improving the security and intelligence of local path planning of the vehicle.

The above is only a preferred embodiment of the present disclosure, the scope of protection of the present disclosure is not limited to the above embodiment, and all technical solutions of the present disclosure under the thought of the present disclosure fall within the scope of protection of the present disclosure. It should be noted that, for a person of ordinary skill in the art, any improvements and modifications made without departing from the principle of the present disclosure should be considered to be within the scope of protection of the present disclosure.

What is claimed is:

1. A method for drivable area detection and autonomous obstacle avoidance of unmanned haulage equipment in deep confined spaces, comprising the following steps:

S1: performing environmental perception by use of binocular vision, and detecting a drivable area of an unmanned auxiliary haulage vehicle in a deep coal mine roadway; specifically comprising:

S11: collecting, by a binocular camera, a video image of the auxiliary haulage vehicle driving in the coal mine roadway, and preprocessing a coal mine roadway image;

S12: for a preprocessed coal mine roadway image obtained in step S11, designing a stereo matching algorithm specific to a stereo matching task of the coal mine roadway to implement a generation of a depth map of the coal mine roadway and computation of 3D point cloud data; specifically comprising:

S121: constructing an atrous convolution window with a specification of 5*5, and assigning different weights to different positions of the window according to a 2D Gaussian distribution function, where the weights in a sequence from left to right and top to bottom are respectively 3, 0, 21, 0, 3, 0, 0, 0, 0, 0, 21, 0, 1, 0, 21, 0, 0, 0, 0, 0, 3, 0, 21, 0, 3;

S122: covering a left view of the coal mine roadway image with the convolution window constructed in step S121, and selecting pixel points in all coverage areas;

S123: covering a right view of the coal mine roadway image with the convolution window constructed in step S121, and selecting pixel points in all coverage areas;

S124: finding an absolute value of a gray value difference of all corresponding pixel points in the convolution window coverage areas of the left and right coal mine roadway views in step S122 and step S123, and according to the weights of the different positions of the window in step S121, performing weighted summation on the weights as a matching cost by using a formula as follows:

$$C_{matching\ cost}(p, d) = \sum_{q \in N_p} \left( \left| I^L(q) - I^R(qd) \right| \cdot w_q \right)$$

where, p is a pixel of the coal mine roadway image, d is a disparity of the coal mine roadway image, $I^L(q)$ and $I^R(qd)$ are window elements taking q and qd as image centers on the left and right coal mine roadway images respectively, w q is the weight of the different positions of the convolution window, and N p is a 5*5 Gaussian atrous convolution window;

S125: performing matching cost aggregation according to a matching cost computation method in step S124, where a matching cost aggregation step size d step is adaptively changed according to a pixel luminance of the coal mine roadway image by using a formula as follows:

$$d_{step} = \frac{D_{max} - 1}{G_{max} - G_{min}} \cdot g + \frac{G_{max} - G_{min}D_{max}}{G_{max} - G_{min}}$$

where, $D_{max}$ is a maximum disparity of a binocular image of the coal mine roadway, $G_{max}$ and $G_{min}$ are a maximum gray value and a minimum gray value of a gray image of the coal mine roadway respectively, and g is a gray value of the gray image of the coal mine roadway;

S126: based on matching costs in an adaptive matching cost aggregation step size $d_{step}$ range obtained in step S125, finding a window with a minimum matching cost value as a disparity by using a winner-take-all (WTA) algorithm, and performing cyclic computation to obtain disparity maps of the coal mine roadway;

S127: based on the disparity maps of the coal mine roadway obtained in step S126, performing disparity image optimization in accordance with a left-right consistency constraint criterion by using a formula as follows:

$$D = \begin{cases} D_l & \text{if } |D_l - D_r| \leq 1 \\ D_{invalid} & \text{otherwise} \end{cases}$$

where, $D_l$ is a left disparity map, $D_r$ is a right disparity map, and $D_{invalid}$ is an occlusion point where no disparity exists; and S128: based on a disparity optimization image of the coal mine roadway obtained in step S127, performing disparity-map to 3D-data computation according to a binocular stereo vision principle, and obtaining 3D point cloud information $(X_w, Y_w, Z_w)$ of the coal mine roadway in the advancing direction of the unmanned haulage vehicle by using a formula as follows:

$$\begin{cases} X_w(x, y) = \dfrac{b \cdot f \cdot (x - u)}{\alpha \cdot d(x, y)} \\ Y_w(x, y) = \dfrac{b \cdot f \cdot (y - v)}{\beta \cdot d(x, y)} \\ Z_w(x, y) = \dfrac{b \cdot f}{d(x, y)} \end{cases}$$

where, b is a distance between left and right optical centers of a binocular camera, ƒ is a focal distance of the camera, d is a disparity of the coal mine roadway image, (x, y) indicates pixel coordinates of the coal mine roadway image, (u, v) indicates coordinates of an origin of an image coordinate system in a pixel coordinate system, and α and β are the focal distances of a pixel in the x and y directions of an image plane respectively;

S13: for the preprocessed coal mine roadway image obtained in step S11, designing a deep learning model for a semantic segmentation task of the coal mine roadway to implement the drivable area semantic segmentation of a 2D image of the coal mine roadway; specifically comprising:

S131: making a semantic segmentation data set of the coal mine roadway in which only a drivable area of the roadway is marked, which specifically comprises:

S1311: performing marking by using labelme image marking software, and starting the labelme software;

S1312: opening a coal mine roadway image folder, and selecting an image;

S1313: only selecting the drivable area of the coal mine roadway with a frame, and naming the drivable area drivable area; and S1314: repeating steps S1312 and S1313, so as to finally complete the making of the drivable area semantic segmentation data set of the 2D image of the coal mine roadway;

S132: pre-training a semantic segmentation model deeplabv3+ model based on a PASCAL VOC data set;

S133: based on a pre-trained deeplabv3+ model obtained in step S132 and the drivable area semantic segmentation data set of the coal mine roadway obtained in step S131, performing pre-trained model fine-tuning;

S134: performing real-time drivable area semantic segmentation of the 2D image of the coal mine roadway according to the deep learning model fine-tuned with the data set of the coal mine roadway obtained in step S133 to obtain a 2D image drivable area;

S14: according to the 3D point cloud data of the coal mine roadway obtained in step S12 and a 2D drivable area segmentation image of the coal mine roadway obtained in step S13, designing a 2D-image to 3D-point-cloud mapping method to implement the drivable area semantic segmentation of a 3D point cloud of the coal mine roadway; specifically comprising:

S141: according to the 2D image drivable area obtained in step S134, performing drivable area image processing based on morphological opening operation; and S142: according to a left coal mine roadway view of the unmanned auxiliary haulage vehicle, performing segmentation for mapping the 2D image drivable area obtained in step S134 to the 3D point cloud so as to obtain a 3D point cloud drivable area of the coal mine roadway by using a formula as follows:

$$P(x, y, z) = \begin{cases} P(x, y, z) & (x, y) \in I(x, y) \\ 0 & (x, y) \notin I(x, y) \end{cases}$$

where, P (x, y, z) is the 3D point cloud data of the coal mine roadway obtained in step S128, I (x, y) is a drivable area image of the coal mine roadway obtained after morphological processing is performed in step S141, and (x, y) indicates pixel coordinates of the left coal mine roadway view collected by the binocular camera;

S2: determining a drivable area of a deep confined roadway according to drivable area detection information in step S1, and performing safe driving of the unmanned auxiliary haulage vehicle in the deep confined roadway by using an autonomous obstacle avoidance algorithm based on a particle swarm optimization algorithm; specifically comprising:

S21: establishing a 2D workspace grid map of the unmanned auxiliary haulage vehicle based on the drivable area detection information in step S1, and intercepting a roadway grid map with an appropriate length, where the roadway grid map comprises deformation and roof leakage of blanket nets and support materials at the top of the roadway, deformation, destruction, leakage and cracking on both sides of the deep roadway, and water puddles and other obstacles on the ground surface of the roadway;

S22: establishing a risk grid map based on the projection of the drivable area in step S1, where the risk grid map contains a safety area, a partial safety area and a complete risk area; the safety area is a part of the drivable area in step S1, in which the unmanned auxiliary haulage vehicle is allowed to drive directly; the complete risk area is an undrivable area, in which the unmanned auxiliary haulage vehicle is completely not allowed to drive; the partial safety area is a drivable area obtained by segmenting in step S1 between the safety area and the undrivable area, in which there is a risk when the unmanned auxiliary haulage vehicle drives; and in autonomous obstacle avoidance planning, a driving route of the vehicle should be planned in the safety area as much as possible, and cannot be planned in a safety risk area, and under a certain condition, the driving route of the vehicle is allowed to include the partial safety area, but should be far away from the complete risk area as much as possible; and a rule of establishment among the three kinds of areas is as follows:

S221: area risk levels are established according to the drivable area of the vehicle obtained by segmenting in step S1: the undrivable area itself is at a highest level 5; eight neighbor grids of a current grid are set to be at a risk level 4 by taking a grid where the undrivable area is located as a reference point; repeating is performed in a similar fashion until a risk level 1 reaches; the risk levels of other grids that are not at risk are still 0, that is, they are fully passable; if there is a conflict in the risk level of a grid, the grid with the conflict is assessed with the highest risk level; and the undrivable area itself is an absolute complete risk area in which vehicles are not allowed to drive, and the safety area and the partial safety area are both drivable areas, where a grid with the risk level of 0 is a safety area;

S23: intercepting a map with an appropriate length, selecting, in the map, a grid allowed to serve as a local end point by taking the unmanned auxiliary haulage vehicle as a start point of the current map, and recording the grid into a table of end points to be selected in accordance with a rule as follows: an end point to be selected is in the last column of a local grid map; the grid is not an obstacle grid; the neighbor grids of the end point to be selected at least comprise one passable grid; and the grid is not surrounded by obstacles;

S24: performing autonomous obstacle avoidance path planning by using a particle swarm path planning method designed for the deep confined roadway;

S25: obtaining an optimal end point to be selected of a driving path by using a greedy strategy, and enabling the unmanned auxiliary haulage vehicle to drive according to the optimal end point and an optimal path; and S26: repeating steps S21 to S25 to complete the autonomous obstacle avoidance of the unmanned auxiliary haulage vehicle in the deep confined roadway until the unmanned auxiliary haulage vehicle arrives at a task destination;

wherein in step S11, the process of collecting, by a binocular camera, a video image of the auxiliary haulage vehicle driving in the coal mine roadway, and preprocessing a coal mine roadway image comprises the following steps:

S111: performing coal mine roadway image correction processing by using a Hartley image correction algorithm;

S112: performing coal mine roadway image enhancement processing on a corrected image obtained in step S111 by using an image enhancement algorithm based on logarithmic Log transformation; and S113: performing image filtering processing on an enhanced image obtained in step S112 by using an image filtering algorithm based on bilateral filtering; and wherein in step S111, the process of performing coal mine roadway image correction processing by using a Hartley image correction algorithm comprises the following steps:

S1111: obtaining an epipolar constraint relationship of the left and right coal mine roadway images obtained according to a camera calibration algorithm, and finding epipolar points p and p' in the left and right coal mine roadway images;

S1112: computing a transformation matrix H' mapping p' to an infinity point $(1, 0, 0)^T$;

S1113: computing a photographic transformation matrix H matched with the transformation matrix H', and satisfying a least square constraint, so as to minimize the following formula:

$$\min \sum_i J(Hm_{1i}, H'm_{2i})^2$$

where, $m_{1i}=(u_1,v_1,1)$, $m_{2i}=(u_2,v_2,1)$, and J represents a cost function error, and $(u_1, v_1)$ and $(u_2, v_2)$ are a pair of matching points on original left and right images; and S1114: allowing the transformation matrix H' in step S1112 and the photographic transformation matrix H in step S1113 to respectively act on the left and right coal mine roadway images to obtain a corrected coal mine roadway image.

2. The method for drivable area detection and autonomous obstacle avoidance of unmanned haulage equipment in deep confined spaces according to claim 1, wherein in step S112, the process of performing coal mine roadway image enhancement processing on the corrected image obtained in step S111 by using an image enhancement algorithm based on logarithmic Log transformation comprises the following steps:

S1121: based on an image logarithmic transformation formula, transforming the corrected coal mine roadway image obtained in step S111 by using a formula as follows:

$$s = c \cdot \log_{v+1}(1+v \cdot r)$$

where, r is an input grayscale of the image, $r \in [0, 1]$, s is an output grayscale of the image, c is a constant, and v is a logarithmic Log transformation intensity adjustment factor;

S1122: normalizing a logarithmically transformed coal mine roadway image obtained in step S1121 to 0-255 for transformation according to a formula as follows:

$$g = \frac{s - s_{min}}{s_{max} - s_{min}} \cdot 255$$

where, s is an unnormalized input grayscale, g is a normalized output grayscale, $s_{max}$ is a maximum grayscale of the image, and $s_{min}$ is a minimum grayscale of the image.

3. The method for drivable area detection and autonomous obstacle avoidance of unmanned haulage equipment in deep confined spaces according to claim 1, wherein in step S113, the process of performing image filtering processing on an enhanced image obtained in step S112 by using an image filtering algorithm based on bilateral filtering comprises the following steps:

S1131: for the enhanced coal mine roadway image obtained in step S112, constructing an n*n convolution template to carry out a convolution operation;

S1132: based on a spatial area and a range area, performing weight assignment on the convolution template in step S1131 according to the following formula:

$$\begin{cases} G_\alpha(\|i-j\|) = e^{-\frac{(x_i-x_j)^2+(y_i-y_j)^2}{2\sigma^2}} \\ G_\beta(|i-j|) = e^{-\frac{(gray(x_i,y_i)-gray(x_j,y_j))^2}{2\sigma^2}} \end{cases}$$

where, $G_\alpha$ is a weight of the spatial area, $G_\beta$ is a weight of the range area, $(x_i, y_i)$, $(x_j, y_j)$ are respectively central pixel coordinates of the convolution template and pixel coordinates of the convolution template in step S1131, σ is a smoothing parameter, gray ( ) is a pixel gray value of the image, i is a center pixel of the convolution template, and j is a pixel of the convolution template;

S1133: according to the convolution template in step S1131 and the weights in step S1132, performing traversal computation of the left and right coal mine roadway images by using the following formula to obtain a filtered image:

$$\begin{cases} I_i = \frac{1}{w_i} \sum_{j \in S} G_\alpha(\|i-j\|) G_\beta(|i-j|) I_j \\ w_i = \sum_{j \in S} G_\alpha(\|i-j\|) G_\beta(|i-j|) \end{cases}$$

where, S is the convolution template in step S1131, is an original input image, h is the filtered image, and $w_i$ is a normalization factor.

4. The method for drivable area detection and autonomous obstacle avoidance of unmanned haulage equipment in deep confined spaces according to claim 1, wherein in step S24, said using a particle swarm path planning method designed for the deep confined roadway comprises the following steps:

S241: performing grid encoding and decoding on the grid map established based on drivable area detection in step S21 and the risk grid map established based on the projection of the drivable area of step S1 in step S22; where according to the features of the grid map, an encoding method of a collision-free local optimal path is: $X_i$ is defined to be an obstacle-free path from a current location of a coal mine robot to a specified target point, which may be represented by all grids that constitute the path, i.e., $$X_i = \{V_1, V_2, \ldots, V_n\}$$

where, $V_1, V_2, \ldots, V_n$ represents the serial numbers of all the grids through which the path $X_i$ passes, there is no complete risk grid with a risk level of 5, and the serial numbers are not repeated mutually; and the serial numbers of the grids are continuously arranged from top to bottom and left to right by taking the first grid at the upper left corner of the grid map as 1 until the last grid at the lower right corner reaches, that is, $$V_n = \left(v_{n,1} - \frac{d}{2}\right) \times G_{row} + v_{n,2} + \frac{d}{2}$$

where, $v_{n,1}$ and $v_{n,2}$ represent a x-coordinate and y-coordinate of a current grid, which are the coordinates of a center point of the grid but not the coordinates of a vertex of the grid; d is a side length of the grid; $G_{row}$ is the number of one row of grids in the current grid map; and after path points are computed, the following formula is used during inverse solving:

$$[v_{n,1}, v_{n,2}] = \left[\mod(V_n - 1, G_{row}) + \frac{d}{2}, \text{ceil}(V_n - 1/G_{row}) - \frac{d}{2}\right]$$

so as to complete the grid encoding and decoding;
- S242: processing obstacle information according to the drivable area detection information in step S1 and the grid map established in step S21, and initializing a particle swarm population; comprising the following steps:
- S2421: initially establishing a square matrix of which the numbers of rows and columns are both the total number $V_{overall}$ of the grid, and establishing a grid connection matrix $M_{link}$;
- S24211: computing whether the current grid is adjacent to all other grids by use of cyclic traversal, and judging whether the adjacent grids are obstacles;
- S24212: if the current grid is not adjacent to all other grids or the adjacent grids are obstacles, setting a corresponding matrix element to 0; and if the current grid is adjacent to all other grids and the adjacent grids are not obstacles, computing a distance between the adjacent grids by using a formula as follows:

$$Vd_{n,i}=\sqrt{(v_{n,1}-v_{i,1})^2+(v_{n,2}-v_{i,2})^2}$$

where, $Vd_{n,i}$ is a grid distance between a grid n and a grid i, and $v_1$ and $v_2$ represent a x-coordinate and y-coordinate of the current grid;
- S2422: determining a start point $V_S$ of the coal mine robot and a final target point $V_E$ thereof, and placing the two at the head and tail nodes of an initial route $X_0$ through the encoding method in step S241;
- S2423: randomly selecting, from a starting node $V_S$, a next grid connected to the start point according to the connection matrix $M_{link}$ established in step 1; and
- S2424: repeating step S2423 according to the connection matrix $M_{link}$ until an encoding combination of a complete path connecting $V_S$ to $V_E$ is completed, and outputting an initial path;
- S243: based on the grid decoding/encoding methods in S241 and the initialized population in S242, updating the velocity and location of particles in a particle swarm by using a formula as follows:

$$v_{in}^{t+1}=\{\phi_1,\phi_2,\phi_3\}$$

a particle velocity consists of three replacement sets; where, $\Phi_1$, $\Phi_2$ and $\Phi_3$ represent three parts of the particle velocity: a self-velocity term, a cognitive term and a social term, and the last two terms are determined by a cognitive factor $c_1$, an individual historical optimal solution $pbest_{t_i}$, a social factor $c_2$, and a global optimal solution $gbest^t$, which is specifically as follows:

$$\phi_1 = \begin{cases} 0, & \omega < R_i \\ \text{rand}(X_i) = \text{rand}(V_1, V_2, \ldots, V_n), & \text{otherwise} \end{cases}$$

$$V_n = \text{round}(\text{rand}(0, 1) \times G_{row}) \times G_{col} + \text{round}(\text{rand}(0, 1) \times G_{col}) + d$$

$$\phi_2 = \begin{cases} \begin{cases} SN(pbest_{ij}^t), & pbest_{ij}^t = x_{in}^t \& j \neq n \\ 0, & \text{otherwise} \end{cases}, & \text{otherwise} \\ 0, & c_1 < R_i \end{cases}$$

$$\phi_3 = \begin{cases} \begin{cases} SN(gbest_j^t), & gbest_j^t = x_{in}^t \& j \neq n \\ 0, & \text{otherwise} \end{cases}, & \text{otherwise} \\ 0, & c_1 < R_i \end{cases}$$

$$R_i = R_{min} + \text{rand}(0, 1) \times (R_{max} - R_{min})$$

where, the self-velocity term is recorded by using random distribution to calculate grid coordinates and using the encoding method in step S241 to calculate corresponding grids, $\omega$ is a velocity inertia weight, and $G_{col}$ is the number of one column of grids in the current grid map; the cognitive term is recorded using the serial numbers of same positions in a set of paths $X_i$ represented by a current particle i in the individual historical optimal solution $pbest_{t_i}$, and part of the serial numbers are set to 0 according to a certain probability; and the social term is updated by using the same strategy to obtain part of the serial numbers of the same positions in a set of paths $X_i$ represented by the current particle i and in the global optimal solution $gbest^t$; $R_i$ represents a replacement rate;

$$x_i^{t+1}=f(\text{replace}(x_i^t))$$

$$\text{replace}(x_i^t)=\text{comb}(x_i^t,v_i^{t+1})=\text{comb}(x_i^t,\{\phi_1,\phi_2,\phi_3\})$$

a position update item is a fitness value of a set of paths $X_i$ represented by the current particle i;

the path $X_i$ represented by the current particle i is subjected to position replacement based on the three replacement sets in the particle velocity; $f(\bullet)$ is a fitness function, comb($\bullet$) is a permutation & combination function, and replace($\bullet$) is a replace function, indicating a replacement made between the current path $X_i$ and the particle velocity $v_i^{t+1}$; and

- S244: determining whether a maximum number of iterations is reached, if so, outputting an optimal autonomous obstacle avoidance path corresponding to a current end point, otherwise, returning to S243 to continue iteration.

5. The method for drivable area detection and autonomous obstacle avoidance of unmanned haulage equipment in deep confined spaces according to claim 4, wherein in step S243, the velocity inertia weight w is:

$$\omega^t = \omega_{min} + (\omega_{max} - \text{rand}() \times \omega_{min})^2 \times \left(\frac{t}{T}\right)^2$$

where, $\omega_{min}$ and $\omega_{max}$ are a minimum inertia weight and a maximum inertia weight respectively; t is a current number of iterations; and T is a maximum number of iterations.

6. The method for drivable area detection and autonomous obstacle avoidance of unmanned haulage equipment in deep confined spaces according to claim 4, wherein in step S243, for the drivable area detection information of the deep confined roadway established in step S1, a fitness function of a particle solution is established by taking the minimization of the total line length and the minimization of risk values as optimization objectives, where a relational expression of each solution in a search space and an objective function is:

$$f = f(X_i, D_i, R_i) = (1 - w_R) \times \sum_{V_j=V_s}^{V_E} Vd_j + w_R \times \sum_{V_j=V_s}^{V_E} Vr_j$$

where, $f$ represents the fitness function, $$D_i = \sum_{V_j=V_s}^{V_s} Vd_j$$

represents a total length of a set of paths represented by the current particle i, $$R_i = \sum_{V_j=V_s}^{V_s} Vr_j$$

represents a risk degree of the path, $V_j$ is a j-th composition grid between a start point $V_S$ and end point $V_E$ of the path, $Vr_j$ represents the risk degree of the j-th grid, and W R represents a risk factor; and a method of computing the fitness function $f$ is made by weighting the length and risk value of each grid in a path solution set $X_i$ according to risk degree indexes, adding obtained values, and taking a reciprocal of the obtained sum.

\* \* \* \* \*

UNITED STATES PATENT AND TRADEMARK OFFICE
CERTIFICATE OF CORRECTION

| | |
|---|---|
| PATENT NO. | : 11,880,208 B2 |
| APPLICATION NO. | : 18/022645 |
| DATED | : January 23, 2024 |
| INVENTOR(S) | : Chunyu Yang et al. |

It is certified that error appears in the above-identified patent and that said Letters Patent is hereby corrected as shown below:

On the Title Page

Foreign Application Priority Data information is missing. Whereas it should read:
Foreign Application Priority Data:
Application No. CN 2021116412849
Priority Date: 2021-12-29

In the Claims

Column 25, Claim 1, Line 53 reads:
left and right coal mine roadway images respectively, w q is
Whereas it should read:
left and right coal mine roadway images respectively, wq is Column 25, Claim 1, Line 55 reads:
window, and N p is a 5*5 Gaussian atrous convolution
Whereas it should read:
window, and Np is a 5*5 Gaussian atrous convolution Column 25, Claim 1, Line 59 reads:
where a matching cost aggregation step size d step is
Whereas it should read:
where a matching cost aggregation step size dstep is Column 30, Claim 3, Lines 25-26 reads:
where, S is the convolution template in step S1131, is an
original input image, h is the filtered image, and wi is a
Whereas it should read:
where, S is the convolution template in step S1131, Ij is an
original input image, Ii is the filtered image, and wi is a Signed and Sealed this
Fifth Day of March, 2024

Katherine Kelly Vidal
*Director of the United States Patent and Trademark Office*

Column 33, Claim 6, Line 8 reads:
grid, and W R represents a risk factor; and a method of
Whereas it should read:
grid, and wR represents a risk factor; and a method of